(12) United States Patent
Miyasaka et al.

(10) Patent No.: US 9,663,396 B2
(45) Date of Patent: May 30, 2017

(54) GLASS SHEET CAPABLE OF BEING INHIBITED FROM WARPING THROUGH CHEMICAL STRENGTHENING

(71) Applicant: ASAHI GLASS COMPANY, LIMITED, Chiyoda-ku (JP)

(72) Inventors: Satoshi Miyasaka, Tokyo (JP); Hideko Nakada, Tokyo (JP); Yasuo Hayashi, Tokyo (JP); Makoto Fukawa, Tokyo (JP); Toshifumi Nihei, Tokyo (JP); Masanobu Shirai, Tokyo (JP); Naoki Okahata, Tokyo (JP); Koji Nakagawa, Tokyo (JP); Kazuhiko Yamanaka, Tokyo (JP); Kunio Watanabe, Tokyo (JP); Shiro Tanii, Tokyo (JP); Nobuaki Ikawa, Tokyo (JP); Daisuke Kobayashi, Tokyo (JP); Junichi Miyashita, Tokyo (JP); Ryosuke Kato, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 14/498,055

(22) Filed: Sep. 26, 2014

(65) Prior Publication Data
US 2015/0079347 A1    Mar. 19, 2015

Related U.S. Application Data

(63) Continuation of application No. PCT/JP2013/057729, filed on Mar. 18, 2013.

(30) Foreign Application Priority Data

Mar. 26, 2012  (JP) .................................. 2012-069557
Mar. 30, 2012  (JP) .................................. 2012-081072
Dec. 19, 2012  (JP) .................................. 2012-276840

(51) Int. Cl.
C03C 3/112    (2006.01)
C03C 4/18     (2006.01)
(Continued)

(52) U.S. Cl.
CPC ................ *C03C 3/112* (2013.01); *C03C 4/18* (2013.01); *C03C 15/00* (2013.01); *C03C 21/002* (2013.01);
(Continued)

(58) Field of Classification Search
CPC ....... C03C 3/112; C03C 4/18; C03C 2204/00; C03C 2204/0055; Y10T 428/315; Y10T 428/24355
See application file for complete search history.

(56) References Cited

U.S. PATENT DOCUMENTS 3,314,772 A * 4/1967 Poole ...................... C03C 21/00
                                                   65/30.13
4,671,814 A    6/1987 Aratani et al.
(Continued)

FOREIGN PATENT DOCUMENTS

JP    61-209929 A    9/1986
JP    62-191449      8/1987
(Continued)

OTHER PUBLICATIONS

International Search Report issued Jun. 25, 2013 in PCT/JP2013/057729 filed Mar. 18, 2013.

*Primary Examiner* — Aaron Austin
*Assistant Examiner* — Michael Zhang
(74) *Attorney, Agent, or Firm* — Oblon, McClelland, Maier & Neustadt, L.L.P.

(57) ABSTRACT

A glass sheet has one surface and the other surface facing the one surface in a thickness direction, wherein a fluorine concentration (average fluorine concentration by SIMS at a
(Continued)

depth of 1 to 24 μm) in the one surface is higher than that in the other surface. The following expression is satisfied: $0.07 \leq \Delta F/\Delta H_2O$. $\Delta F$ (mol %) is a value obtained by subtracting an average fluorine concentration in the surface having the lower fluorine concentration from that in the surface having the higher fluorine concentration, and $\Delta H_2O$ (mol %) is an absolute value of a value obtained by subtracting an average $H_2O$ concentration in the surface having the higher fluorine concentration from that in the surface having the lower fluorine concentration.

7 Claims, 11 Drawing Sheets

(51) Int. Cl.
 C03C 21/00 (2006.01)
 C03C 23/00 (2006.01)
 C03C 15/00 (2006.01)
(52) U.S. Cl.
 CPC ...... *C03C 23/0055* (2013.01); *C03C 2204/00* (2013.01); *Y10T 428/24355* (2015.01); *Y10T 428/315* (2015.01)

(56) References Cited

U.S. PATENT DOCUMENTS

| 4,859,636 | A | 8/1989 | Aratani et al. |
| 2010/0089096 | A1 | 4/2010 | Tamitsuji et al. |
| 2010/0159227 | A1 | 6/2010 | Tamitsuji et al. |
| 2011/0151194 | A1 | 6/2011 | Tamitsuji et al. |
| 2011/0165393 | A1* | 7/2011 | Bayne .................... C03C 15/02 428/215 |
| 2011/0293928 | A1 | 12/2011 | Chu et al. |
| 2016/0200627 | A1* | 7/2016 | Miyasaka ............... C03C 23/00 428/141 |

FOREIGN PATENT DOCUMENTS

| JP | 6-51580 B2 * | 7/1994 |
| JP | 2000-128583 A | 5/2000 |
| JP | 2002-234754 A | 8/2002 |
| JP | 2004-35297 A | 2/2004 |
| JP | 2005-67974 A | 3/2005 |
| JP | 2007-101134 A | 4/2007 |
| JP | 2010-189228 | 9/2010 |
| JP | 20100189228 A * | 9/2010 |
| WO | 2007/004634 | 1/2007 |
| WO | WO 2008/004481 A1 | 1/2008 |
| WO | 2008/156176 | 12/2008 |
| WO | 2008/156177 | 12/2008 |
| WO | 2012/141310 | 10/2012 |

* cited by examiner

GLASS SHEET CAPABLE OF BEING INHIBITED FROM WARPING THROUGH CHEMICAL STRENGTHENING

TECHNICAL FIELD

The present invention relates to a glass sheet capable of reducing warpage during chemical strengthening.

BACKGROUND ART

In recent years, in a flat panel display device, such as a mobile phone or a personal digital assistant (PDA), in order to enhance protection and beauty of a display, a thin sheet-shaped cover glass is arranged on a front surface of a display so as to cover a region wider than an image display area.

Reduction in weight and thickness is required for this kind of flat panel display device, and to meet the requirement, reduction in thickness is also required for a cover glass for display protection.

However, when the thickness of the cover glass is reduced, strength thereof is lowered, and the cover glass itself may break during use or due to drop thereof during carrying. Accordingly, there is a problem in that the primary role of protecting a display device cannot be performed.

For this reason, in the cover glass of the related art, in order to improve scratch resistance, a float glass produced by a float method is chemically strengthened to form a compressive stress layer in the surface thereof, thereby enhancing scratch resistance of the cover glass.

It has been reported that warpage occurs in a float glass after chemical strengthening, causing deterioration of flatness (Patent Documents 1 to 3). The warpage occurs due to the difference in the degree of behavior of chemical strengthening between a glass surface (hereinafter, referred to as a top surface) which is not in contact with molten tin during float forming and a glass surface (hereinafter, referred to as a bottom surface) which is in contact with molten tin.

The warpage of a float glass becomes large with an increase in the degree of behavior of chemical strengthening. Accordingly, in a chemically strengthened float glass having surface compressive stress of 600 MPa or more and a depth of a compressive stress layer of 15 μm or more, which has been developed to response to the requirement of high scratch resistance, the problem of warpage becomes obvious compared to a chemically strengthened float glass of the related art having surface compressive stress (CS) of about 500 MPa and a depth of a compressive stress layer (DOL) of about 10 μm.

Patent Document 1 discloses a glass strengthening method in which, after a $SiO_2$ film is formed on a glass surface, chemical strengthening is performed to adjust the amount of ions which diffuse into glass during chemical strengthening. Patent Documents 2 and 3 disclose a method in which surface compressive stress on a top surface side is set within a specific range, thereby reducing warpage after chemical strengthening.

In the related art, in order to reduce the problem of warpage, a coping method of decreasing strengthening stress by chemical strengthening, or removing a surface heterogeneous layer through grinding treatment or polishing treatment on at least one surface of the glass, and then performing chemical strengthening, has been carried out.

CITATION LIST

Patent Documents

Patent Document 1: US 2011/0293928 A1
Patent Document 2: WO 2007/004634 A1
Patent Document 3: JP S62-191449 A

SUMMARY OF INVENTION

Technical Problem

However, in the method described in Patent Document 1 in which chemical strengthening is performed after the $SiO_2$ film is formed on the glass surface, preheating conditions during chemical strengthening are limited, and the film quality of the $SiO_2$ film may change depending on the conditions to affect warpage. As described in Patent Documents 2 and 3, the method in which surface compressive stress on the top surface side is set within the specific range has a problem from the viewpoint of strength of glass.

The method in which at least one surface of glass is subjected to grinding treatment or polishing treatment before chemical strengthening has a problem from the viewpoint of improvement of productivity, and it is preferable to omit the grinding treatment, polishing treatment or the like.

When warpage occurs to a certain degree or more after chemical strengthening, the gap between glass and a stage becomes too large when a black frame is printed on a cover glass, and glass may not be adsorbed to the stage. In a case of a touch panel integrated cover glass, ITO (Indium Tin Oxide) or the like may be formed in a state of a large substrate in a subsequent process. At this time, failure may occur. For example, conveyance abnormality, such as contact with an air knife of a chemical processing tank or cleaning tank, may occur, warpage may increase during ITO film formation, the film forming state of ITO in a peripheral portion of a substrate may not be appropriate, or the ITO film may be separated. In a case of a type in which a space is present between an LCD (Liquid Crystal Display) and a cover glass to which a touch panel has been attached, when warpage occurs in the cover glass to a certain degree or more, luminance irregularity or Newton rings may occur.

Accordingly, an object of the present invention is to provide a glass sheet by which warpage after chemical strengthening can be effectively suppressed and polishing treatment or the like before chemical strengthening can be omitted or simplified.

Solution to Problem

The present inventors have found that a glass surface is subjected to fluorination, thereby suppressing the occurrence of the difference in the degree of behavior of chemical strengthening between one surface and the other surface of glass and reducing warpage after chemical strengthening, and have completed the present invention based on the finding.

That is, the present invention provides the followings.

1. A glass sheet, having one surface and the other surface facing the one surface in a thickness direction, wherein a fluorine concentration in the one surface is higher than the fluorine concentration in the other surface in which the fluorine concentration is an average fluorine concentration (mol %) by SIMS at a depth of 1 to 24 μm, and the following expression (1) is satisfied:

$$0.07 \leq \Delta F / \Delta H_2 O \quad (1)$$

wherein ΔF is a value obtained by subtracting an average fluorine concentration (mol %) by SIMS at the depth of 1 to 24 μm in the surface having the lower fluorine concentration from the average fluorine concentration (mol %) by SIMS at the depth of 1 to 24 μm in the surface having the higher fluorine concentration, and $\Delta H_2 O$ is an absolute value of a value obtained by subtracting an average $H_2O$ concentration (mol %) by SIMS at the depth of 1 to 24 μm in the surface having the higher fluorine concentration from the average $H_2O$ concentration (mol %) by SIMS at the depth of 1 to 24 μm in the surface having the lower fluorine concentration.

2. A glass sheet, having one surface and the other surface facing the one surface in a thickness direction, wherein a fluorine concentration in the one surface is higher than the fluorine concentration in the other surface in which the fluorine concentration is an average fluorine concentration (mol %) by SIMS at a depth of 1 to 24 μm, and the following expression (2) is satisfied:

$$1 \leq x \quad (2)$$

wherein x is a maximum depth (μm) at which a gradient at an arbitrary depth $x_i$ (μm) satisfies the following expression (3) in an F concentration profile by SIMS:

$$[F(x_i) - F(x_i + 0.1)] / 0.1 = -0.015 \quad (3)$$

wherein $F(x_i)$ represents a fluorine concentration (mol %) by SIMS at the depth $x_i$ (μm).

3. The glass sheet according to the above item 1 or 2, which is manufactured by a float method.

4. The glass sheet according to any one of the above items 1 to 3, which has a thickness of 1.5 mm or less.

5. The glass sheet according to any one of the above items 1 to 4, which has a thickness of 0.8 mm or less.

6. The glass sheet according to any one of the above items 1 to 5, wherein a recess having a diameter of 10 nm or more is not present or the recess is present with a density of 6 recesses/μm² or less, in the surface having the higher fluorine concentration.

7. A glass sheet, which is obtained by chemically strengthening the glass sheet according to any one of the above items 1 to 6.

8. A flat panel display device, comprising a cover glass, wherein the cover glass is the glass sheet according to the above item 7.

Advantageous Effects of Invention

According to the glass sheet of the present invention, the surface thereof has been subjected to fluorination, the occurrence of the difference in the degree of behavior of chemical strengthening between one surface and the other surface of glass is suppressed, and stress by the chemical strengthening is not lowered. Furthermore, even if polishing treatment or the like before chemical strengthening is omitted or simplified, it is possible to reduce warpage of glass after chemical strengthening and to obtain excellent flatness.

DESCRIPTION OF EMBODIMENTS

1. Glass Sheet

Figure 1:
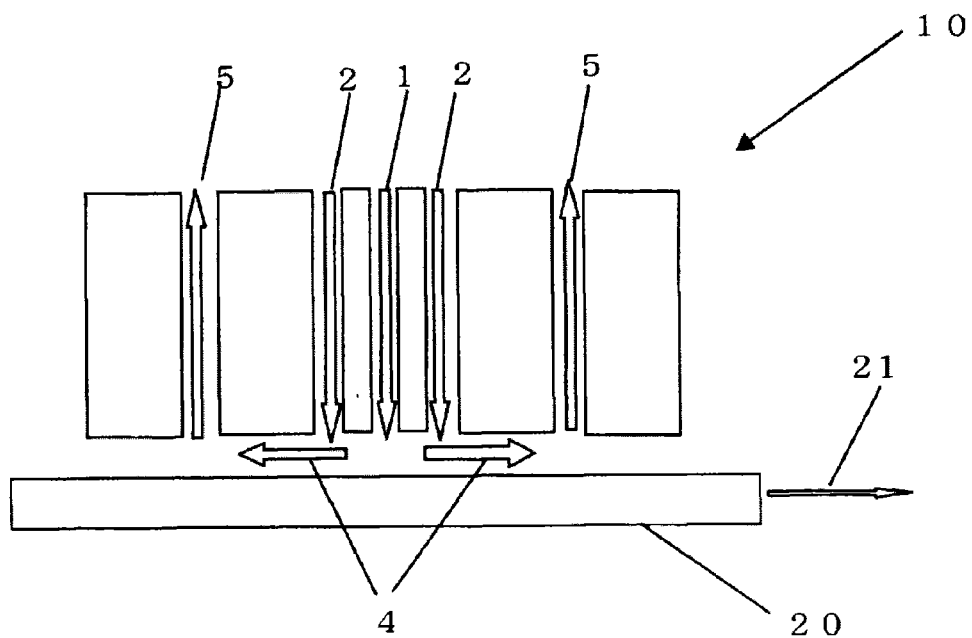
FIG. 1 is a diagram schematically showing a double-flow type injector which can be used in the present invention.

In the present invention, the term "glass sheet" includes a molded product of molten glass in a sheet shape, and for example, so-called glass ribbon in a float bath is also a glass sheet. Warpage of the glass sheet after chemical strengthening occurs due to the difference in the degree of behavior of chemical strengthening between one surface and the other surface of the glass sheet. Specifically, for example, in a case of float glass, warpage after chemical strengthening occurs due to the difference in the degree of behavior of chemical strengthening between a glass surface (top surface) which is not in contact with molten tin during float forming and a glass surface (bottom surface) which is in contact with molten metal (usually, tin).

According to the glass sheet of the present invention, one surface of the glass sheet is typically subjected to fluorination, and the diffusion rate of ions is adjusted on the one surface and the other surface of the glass sheet, thereby adjusting the degree of behavior of chemical strengthening on the one surface and the other surface. For this reason, according to the glass sheet of the present invention, it is possible to reduce warpage of the glass sheet after chemical strengthening without adjusting strengthening stress and performing treatments, such as grinding and polishing, before chemical strengthening treatment.

As a mechanism which can reduce warpage after chemical strengthening by fluorinating the surface of the glass sheet, it is considered that the following phenomenon occurs.

(1) Relaxation is promoted by fluorine entrapped in the surface of glass, and CS (compressive stress, surface compressive stress) of a fluorinated surface is lowered.

(2) Ion exchange is inhibited by fluorine entrapped in the surface of glass, and the DOL (depth of layer, depth of compressive stress) of the fluorinated surface is lowered.

(3) Dealkalization of glass occurs due to fluorination.

(4) The main component of the glass surface is changed by fluorination, and since Si as $SiF_4$ or $H_2SiF_6$ in glass decreases from the glass surface, the degree of behavior of stress is changed.

(5) Due to fluorination, dehydration from the glass surface is suppressed or water penetrates, whereby warpage is reduced.

1A. Parameter which Defines Appropriate Amount of Addition of Fluorine for Warpage Improvement The warpage of glass by chemical strengthening is due to the difference in the degree of behavior of chemical strengthening between the top surface and the bottom surface. The difference in the degree of behavior of chemical strengthening is considerably affected by the amount of moisture in glass. Fluorine is added to a glass surface layer and the warpage is thus improved by various factors. In regard to an appropriate amount of fluorine to be added to glass, the following parameter is set taking into consideration the difference in the amount of moisture between the top surface and the bottom surface.

The glass sheet of the present invention is directed to a glass sheet having one surface and the other surface facing the one surface in a thickness direction, wherein a fluorine concentration in the one surface is higher than a fluorine concentration in the other surface, and the following expression (1) is satisfied.

$$0.07 \leq \Delta F/\Delta H_2O \quad (1)$$

In the expression (1), $\Delta F$ is a value obtained by subtracting an average fluorine concentration (mol %) by SIMS at a depth of 1 to 24 μm in the surface having the lower fluorine concentration from the average fluorine concentration (mol %) by SIMS at the depth of 1 to 24 μm in the surface having the higher fluorine concentration.

Figure 7A:
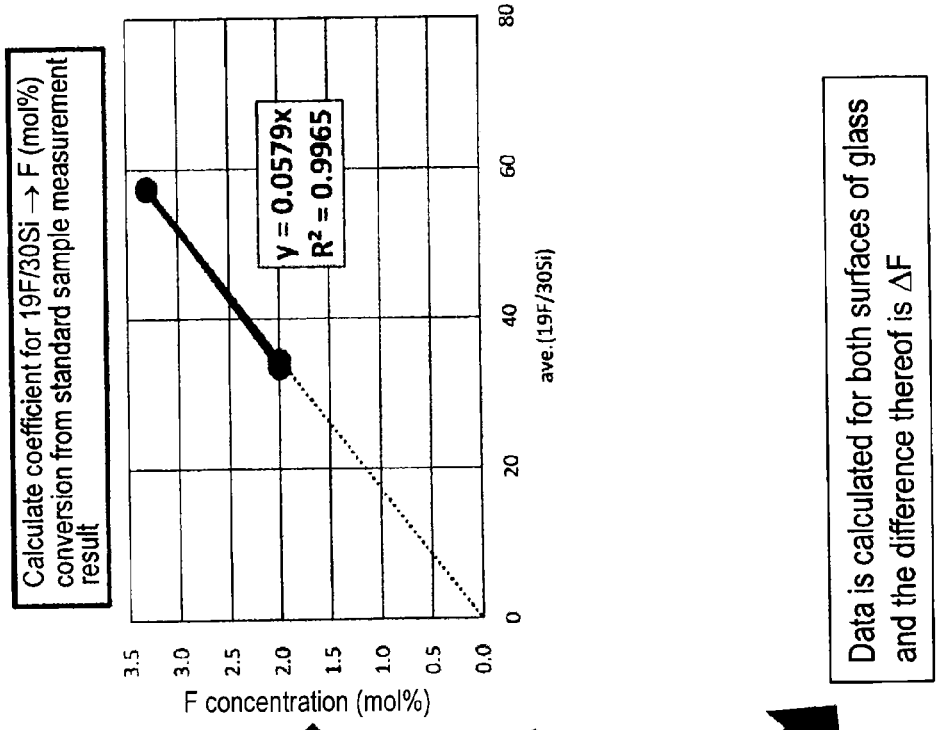
FIGS. 7A-7C show a fluorine concentration profile by SIMS of typical soda lime glass.
Figure 7B:
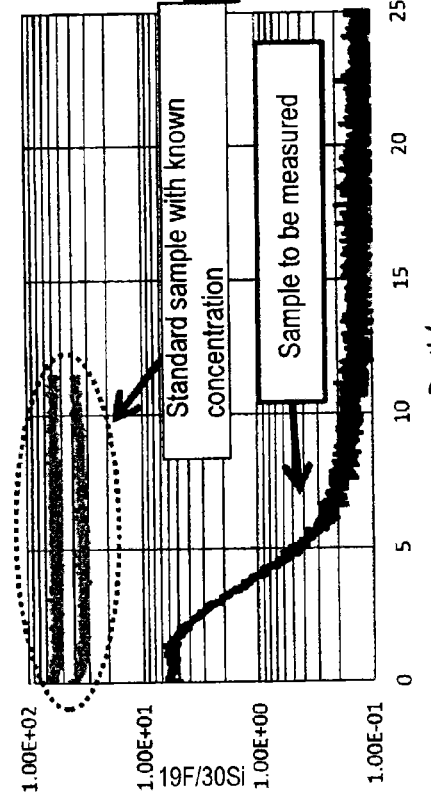
Figure 7C:
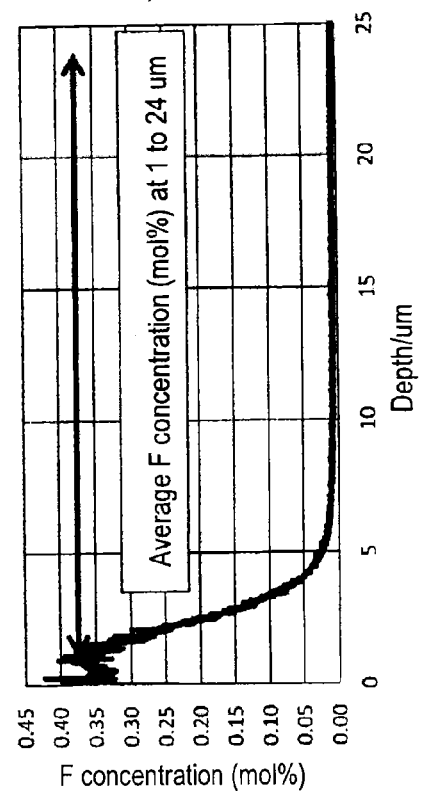

The fluorine concentration is calculated from a profile obtained through a fluorine concentration profile measurement in glass using a SIMS apparatus, by the following procedure (a1) to (a3). FIGS. 7A-7C show a fluorine concentration profile of typical soda lime glass by SIMS.

(a1) The fluorine concentration profiles of a standard sample with a known concentration and a sample to be measured, by SIMS, are measured [FIG. 7A].

(a2) A calibration curve is prepared from the measurement result of the standard sample, and a coefficient for converting 19F/30Si to a fluorine concentration (mol %) is calculated [FIG. 7B].

(a3) The fluorine concentration (mol %) of the sample to be measured is determined from the coefficient calculated in the step (a2). An average fluorine concentration by SIMS at the depth of 1 to 24 μm is a value obtained by accumulating the fluorine concentration at the depth of 1 to 24 μm and dividing the accumulated fluorine concentration by the coefficient, i.e. 23 [FIG. 7C].

An absolute value of the difference between the values of the average fluorine concentrations (mol %) by SIMS at the depth of 1 to 24 μm calculated for both facing surfaces in the thickness direction of glass by the procedure (a1) to (a3) is $\Delta F$.

In the expression (1), $\Delta H_2O$ is an absolute value of a value obtained by subtracting an average $H_2O$ concentration (mol %) by SIMS at the depth of 1 to 24 μm in the surface having the higher fluorine concentration from the average $H_2O$ concentration (mol %) by SIMS at the depth of 1 to 24 μm in the surface having the lower fluorine concentration.

Figure 8B:
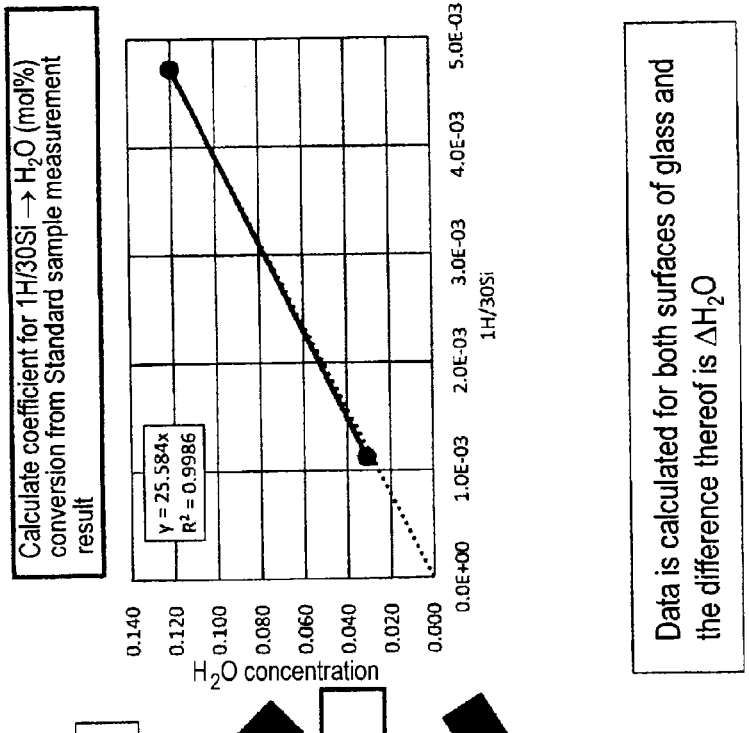
FIGS. 8A-8C show an $H_2O$ concentration profile by SIMS of typical soda lime glass.
Figure 8A:
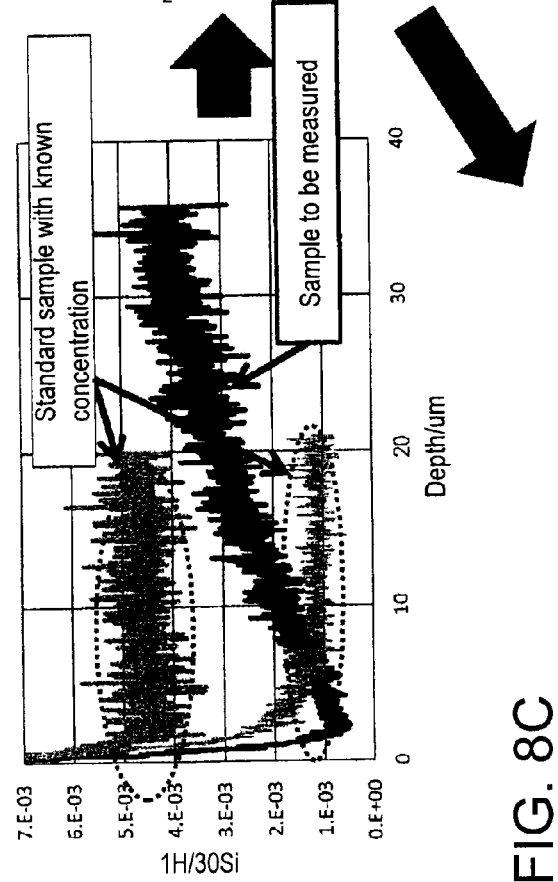
Figure 8C:
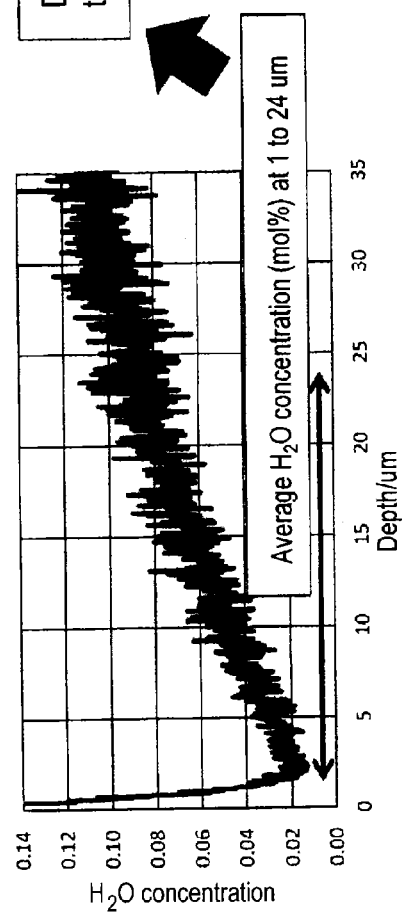

The average moisture concentration (mol %) is calculated from a profile obtained through a fluorine concentration profile measurement in glass using a SIMS apparatus by the following procedure (b1) to (b3). FIGS. 8A-8C show an $H_2O$ concentration profile of typical soda lime glass by SIMS.

(b1) The $H_2O$ concentration profiles of a standard sample with a known concentration and a sample to be measured, by SIMS, are measured [FIG. 8A].

(b2) A calibration curve is prepared from the measurement result of the standard sample, and a coefficient for converting 1H/30Si to an $H_2O$ concentration (mol %) is calculated [FIG. 8B].

(b3) The $H_2O$ concentration (mol %) of the sample to be measured is determined from the coefficient calculated in the step (b2). An average $H_2O$ concentration (mol %) by SIMS at the depth of 1 to 24 μm is a value obtained by accumulating the $H_2O$ concentrations at the depth of 1 to 24 μm and dividing the accumulated $H_2O$ concentration by 23 [FIG. 8C].

An absolute value of the difference between the values of the average $H_2O$ concentrations (mol %) by SIMS at the depth of 1 to 24 μm for both facing surfaces in the thickness direction of glass by the procedure (b1) to (b3) is $\Delta H_2O$.

Figure 9:
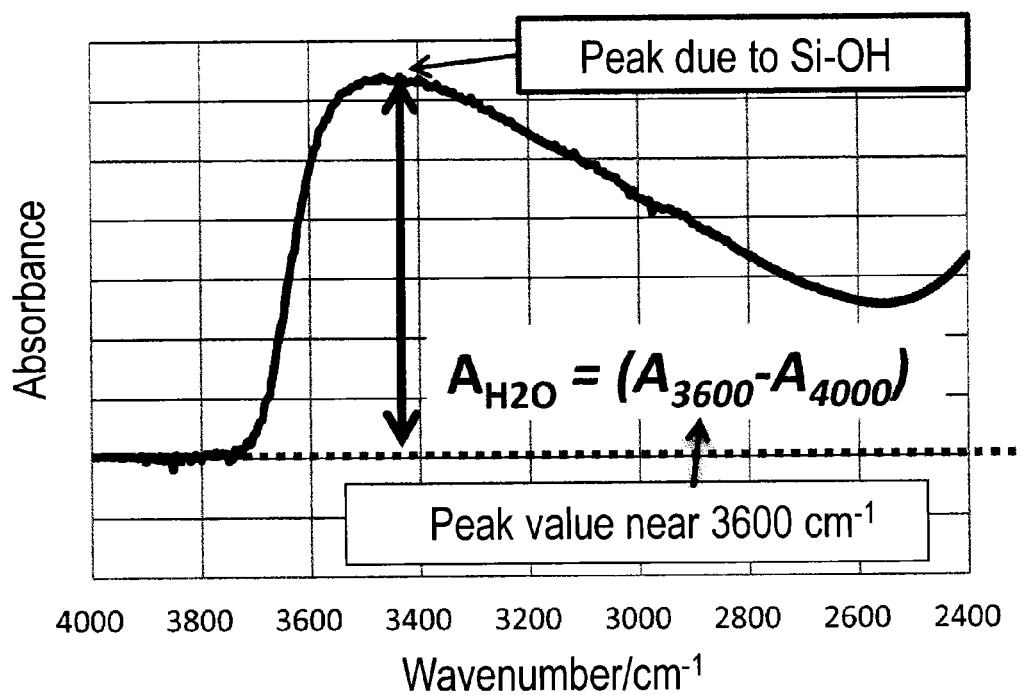
FIG. 9 shows an IR spectrum of typical soda lime glass.

In the step (b2), in regard to the $H_2O$ concentration in the standard sample, the IR spectrum of glass is acquired using an FT-IR apparatus for the sample to be measured which has been subjected to double-surface polishing on both the top surface and bottom surface and processed so as to have no distribution of the moisture concentration in the thickness direction of glass, and the moisture concentration (mol %) is calculated from peak intensity due to water in glass. The IR spectrum of typical soda lime glass is shown in FIG. 9.

That is, the moisture concentration $C_{H2O}$ (mol %) in glass is calculated by the expression (ii) using Lambert-Beers' law expressed in the expression (i), d: specific gravity (g/cm$^3$) of glass, and Mw: average molecular weight of glass.

$$A_{H2O} = \epsilon_{H2O} \times C \times l \quad (i)$$

$A_{H2O}$: molar absorbance coefficient (L mol$^{-1}$ cm$^{-1}$) of $H_2O$ in glass
C: $H_2O$ concentration (mol L$^{-1}$) in glass
l: optical path length (cm)

[Equation 1]

$$C_{H2O} \text{ (mol \%)} = [(A_{H2O}/\epsilon_{H2O} \times l)/(d/Mw)] \times 100 \quad (ii)$$

Figure 10:
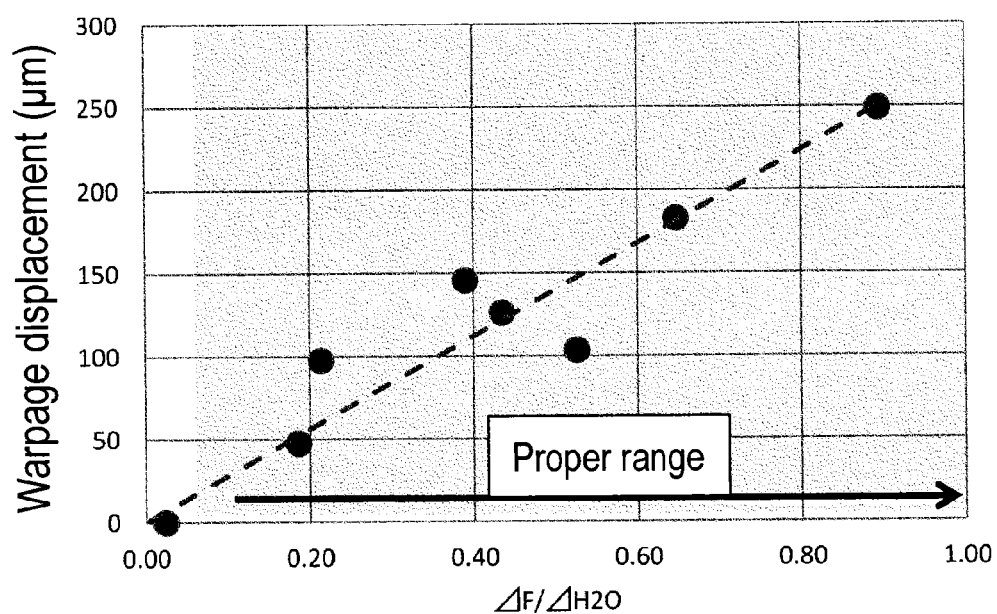
FIG. 10 is a diagram showing the correlation relationship between $\Delta F/\Delta H_2O$ and the amount of warpage displacement.

As shown in FIG. 10, $\Delta F/\Delta H_2O$ and the amount of warpage displacement of glass have a correlation relationship and satisfy $0.07 \leq \Delta F/\Delta H_2O$, whereby it is possible to effectively suppress warpage after chemical strengthening. $\Delta F/\Delta H_2O$ is 0.07 or more, preferably 0.2 or more, and more preferably 0.4 or more. If $\Delta F/\Delta H_2O$ is less than 0.07, it is not appropriate since there in no advantageous difference in the displacement of warpage.

1B. Parameter which Defines Penetration Depth of Fluorine for Warpage Improvement Fluorine is added to the glass surface layer and the warpage after chemical strengthening is thus improved. In regard to the penetration depth of fluorine, the following parameter is set taking into consideration the difference in the amount of moisture between the top surface and the bottom surface.

The glass sheet of the present invention is a glass sheet in which a fluorine concentration in one surface facing the other surfaces in a thickness direction is higher than a fluorine concentration in the other surface, and the following expression (2) is satisfied.

$$1 \leq x \qquad (2)$$

In the expression (2), x is a maximum depth (μm) at which a gradient at an arbitrary depth $x_i$ (μm) satisfies the expression (3) in a fluorine concentration profile by SIMS.

$$[F(x_i)-F(x_i+0.1)]/0.1 = -0.015 \qquad (3)$$

In the expression (3), $F(x_i)$ represents a fluorine concentration (mol %) by SIMS at the depth $x_i$ (μm).

Figure 11A:
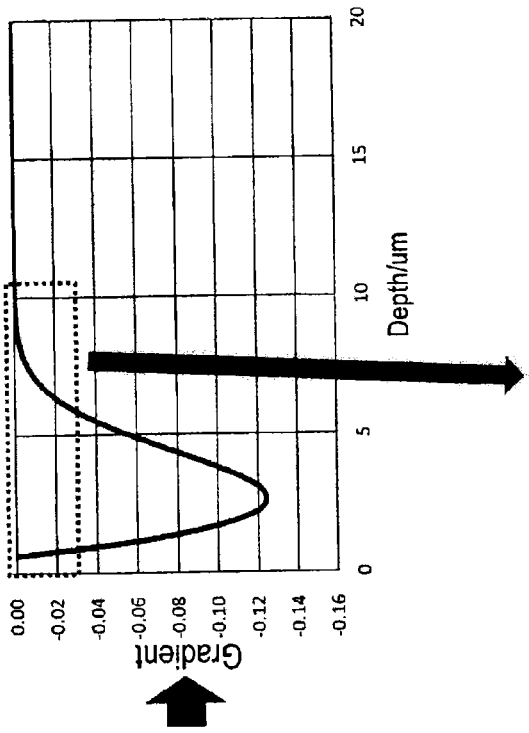
FIG. 11A shows a fluorine concentration profile by SIMS of typical soda lime glass.
Figure 11B:
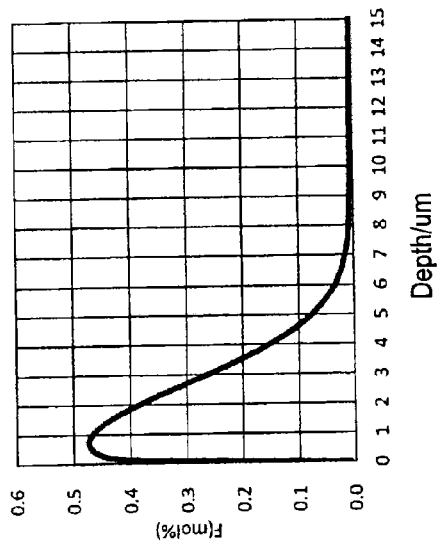
FIG. 11B is a diagram plotting a depth on the horizontal axis and a gradient at an arbitrary point $x_i$ expressed by the expression (a) on the vertical axis.

FIG. 11A shows a fluorine concentration profile of typical soda lime glass by SIMS. FIG. 11B is a graph plotting a depth on the horizontal axis and a gradient at an arbitrary point $x_i$ expressed by the following expression (a) on the vertical axis. In the following expression (a), Fx represents a fluorine concentration (mol %) at a point x.

$$[F(x_i)-F(x_i+\Delta x)]/\Delta x \qquad (a)$$

When Δx is 0.1, a maximum depth x (μm) at which the gradient expressed by the expression (a) is −0.0015 is 1 or more, preferably 2 or more, and more preferably 3 or more. If x is less than 1, there is no advantageous difference in the displacement of warpage.

Figure 11C:
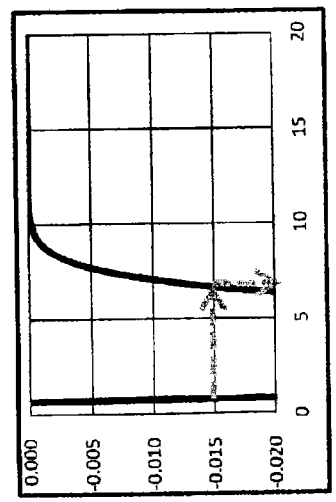
FIG. 11C is an enlarged view of a dotted-line portion in FIG. 11B.

FIG. 11C is an enlarged view of a dotted-line portion in the graph of FIG. 11B. For example, in FIG. 11C, when Δx is 0.1, the maximum depth x (μm) at which the gradient expressed by the expression (a) is −0.0015 is 6.5.

Secondary ion intensity $I_{M1}$ of an isotope $M_1$ of an element M in secondary ion mass spectrometry is proportional to primary ion intensity $I_P$, a sputtering rate Y of a matrix, a concentration $C_M$ (the ratio to the total concentration) of the element M, a presence probability $\alpha_1$ of the isotope $M_1$, a secondary ionization rate $\beta_M$ of the element M, and permeation efficiency η (including detection efficiency of a detector) of a mass spectrometer.

$$I_{M1} = A \cdot I_P \cdot Y \cdot C_M \cdot \alpha_1 \cdot \beta_M \cdot \eta \qquad \text{(Expression 1)}$$

Here, A is the ratio of a detection area of a secondary ion to the scanning range of a primary ion beam. In general, since it is difficult to determine η of the apparatus, it is not possible to determine the absolute value of $\beta_M$. Accordingly, a main component element or the like in the same sample is used as a reference element, and the ratio to (Expression 1) is taken, thereby deleting η.

When a reference element is R and an isotope thereof is $R_j$, (Expression 2) is obtained.

$$I_{M1}/I_{Rj} = (C_M \cdot \alpha_1 \cdot \beta_M)/(C_R \cdot \alpha_j \cdot \beta_R) = C_M/K \qquad \text{(Expression 2)}$$

K is a relative sensitivity factor of the element M to the element R.

$$K = (C_R \cdot \alpha_j \cdot \beta_R)/(\alpha_1 \cdot \beta_M) \qquad \text{(Expression 3)}$$

In this case, the concentration of the element M is determined by (Expression 4).

$$C_M = K \cdot I_{M1}/I_{Rj} \qquad \text{(Expression 4)}$$

In the present invention, F corresponds to $M_1$, and Si corresponds to $R_j$. Accordingly, the intensity ratio (F/Si) of both is equal to a value obtained by dividing the fluorine concentration $C_M$ by K from (Expression 2). That is, F/Si is a direct index of a fluorine concentration.

As the analysis conditions of the secondary ion mass spectrometry analysis (SIMS analysis), for example, the following conditions are exemplified. The following analysis conditions are for illustration and should be appropriately changed depending on measurement apparatus, sample, or the like. The depth on the horizontal axis of a profile in a depth direction obtained by SIMS analysis is determined by measuring a depth of an analysis crater using a probe type film thickness meter (for example, Dektak 150 manufactured by Veeco Instruments).

(Analysis Condition)
Primary ion species: Cs+
Primary ion incident angle: 60°
Primary acceleration voltage: 5 kV As specific analysis conditions, for example, the following conditions are exemplified.

(Analysis Condition)
Measurement apparatus: secondary ion mass spectrometry apparatus having quadrupole mass spectrometer
Primary ion species: Cs+
Primary acceleration voltage: 5.0 kV
Primary ion current: 1 μA
Primary ion incident angle (angle from direction perpendicular to sample surface): 60°
Luster size: 200×200 μm$^2$
Detection region: 40×40 μm$^2$
Secondary ion polarity: minus
Electron gun for neutralization: used As a secondary ion mass spectrometry apparatus having a quadrupole mass spectrometer, for example, ADEPT 1010 manufactured by Ulvac-Phi Incorporated is exemplified.

2. Method of Manufacturing Glass Sheet

A method of manufacturing a glass sheet in the present invention is not particularly limited, and a glass sheet having various compositions may be used insofar as the glass sheet has a composition capable of being strengthened by chemical strengthening treatment. For example, various raw materials are compounded with appropriate amounts, heated and molten, followed by homogenizing by defoaming, stirring, or the like, and it is formed in a sheet shape by a known float method, a down-draw method (for example, a fusion method or the like), a press method or the like, and after annealing, the sheet is cut to a desired size, followed by subjecting to polishing. Thus, a glass sheet is manufactured. Of these manufacturing methods, in particular, glass manufactured by a float method is preferable since warpage improvement after chemical strengthening, which is the effect of the present invention, is easily exhibited.

As the glass sheet which is used in the present invention, specifically, for example, a glass sheet formed of soda-lime silicate glass, aluminosilicate glass, borate glass, lithium aluminosilicate glass, or borosilicate glass is typically exemplified.

Of these, glass having a composition containing Al is preferable. If alkali coexists, Al is tetracoordinated, and similarly to Si, participates in forming a network of glass. If tetracoordinated Al increases, movement of alkali ions is facilitated, and ion exchange easily proceeds during chemical strengthening treatment.

The thickness of the glass sheet is not particularly limited, and for example, is 2 mm, 0.8 mm, 0.73 mm, and 0.7 mm. In order to effectively perform chemical strengthening treatment described below, the thickness of the glass sheet is usually preferably 5 mm or less, more preferably 3 mm or less, more preferably 1.5 mm or less, and particularly preferably 0.8 mm or less.

Usually, the warpage amount of a glass sheet having a thickness of 0.7 mm after chemical strengthening is required to be 40 μm or less. When CS is 750 MPa and DOL is 40 μm in a 90 mm square glass sheet, the warpage amount after chemical strengthening is about 130 μm. On the other hand, since the warpage amount of the glass sheet after chemical strengthening is inversely proportional to the square of the sheet thickness, the warpage amount when the thickness of the glass sheet is 2.0 mm becomes about 16 μm, and warpage will not substantially become a problem. Accordingly, there is a possibility that the problem of warpage after chemical strengthening is likely to occur when the thickness of the glass sheet is less than 2 mm, and typically, is 1.5 mm or less.

The composition of the glass sheet of the present invention is not particularly limited, and for example, the following glass composition is exemplified. For example, the description of "0 to 25% of MgO is contained", means that MgO is not essential and may be contained up to 25%, and soda lime silicate glass is included in the glass (i). Soda lime silicate glass is glass which contains, in terms of mol %, 69 to 72% of $SiO_2$, 0.1 to 2% of $Al_2O_3$, 11 to 14% of $Na_2O$, 0 to 1% of $K_2O$, 4 to 8% of MgO, and 8 to 10% of CaO.

(i) As glass which has a composition containing, in mol %, 50 to 80% of $SiO_2$, 0.1 to 25% of $Al_2O_3$, 3 to 30% of $Li_2O+Na_2O+K_2O$, 0 to 25% of MgO, 0 to 25% of CaO, and 0 to 5% of $ZrO_2$, soda lime silicate glass, or glass which has a composition containing, in mol %, 50 to 80% of $SiO_2$, 2 to 25% of $Al_2O_3$, 0 to 10% of $Li_2O$, 0 to 18% of $Na_2O$, 0 to 10% of $K_2O$, 0 to 15% of MgO, 0 to 5% of CaO, and 0 to 5% of $ZrO_2$, are exemplified (ii) Glass which has a composition containing, in mol %, 50 to 74% of $SiO_2$, 1 to 10% of $Al_2O_3$, 6 to 14% of $Na_2O$, 3 to 11% of $K_2O$, 2 to 15% of MgO, 0 to 6% of CaO, and 0 to 5% of $ZrO_2$, wherein a total content of $SiO_2$ and $Al_2O_3$ is 75% or less, a total content of $Na_2O$ and $K_2O$ is 12 to 25%, and a total content of MgO and CaO is 7 to 15%

(iii) Glass which has a composition containing, in mol %, 68 to 80% of $SiO_2$, 4 to 10% of $Al_2O_3$, 5 to 15% of $Na_2O$, 0 to 1% of $K_2O$, 4 to 15% of MgO, and 0 to 1% of $ZrO_2$ (iv) Glass which has a composition containing, in mol %, 67 to 75% of $SiO_2$, 0 to 4% of $Al_2O_3$, 7 to 15% of $Na_2O$, 1 to 9% of $K_2O$, 6 to 14% of MgO, and 0 to 1.5% of $ZrO_2$, wherein a total content of $SiO_2$ and $Al_2O_3$ is 71 to 75%, a total content of $Na_2O$ and $K_2O$ is 12 to 20%, and when CaO is contained, the content of CaO is less than 1%

In the method of manufacturing a glass sheet in the present invention, gas or liquid containing molecules having fluorine atoms in the structure thereof is brought into contact with at least one surface of a glass sheet or glass ribbon to perform surface treatment. When the gas or liquid is brought into contact with at least one surface of the glass ribbon to perform surface treatment, it is preferable that the temperature of the glass ribbon is 650° C. or higher. The temperature of the glass ribbon is 650° C. or higher, whereby HF spraying treatment is easily carried out in an HF total contact amount (described below) enough to reduce the warpage amount of glass after chemical strengthening while suppressing the generation of recesses described below. Hereinafter, the term "glass sheet" may be used as a generic term of a glass sheet and a glass ribbon.

Examples of the gas or liquid containing molecules having fluorine atoms in the structure thereof include hydrogen fluoride (HF), freon (for example, chlorofluorocarbon, fluorocarbon, hydrochlorofluorocarbon, hydrofluorocarbon, halon), hydrofluoric acid, fluorine (simple substance), trifluoroacetic acid, carbon tetrafluoride, silicon tetrafluoride, phosphorus pentafluoride, phosphorus trifluoride, boron trifluoride, nitrogen trifluoride, chlorine trifluoride, and the like, and the gas or liquid is not limited to these kinds of gas or liquid.

Of these, hydrogen fluoride, freon, or hydrofluoric acid is preferred that the viewpoint that reactivity with the glass sheet surface is high. Of these kinds of gas, two or more kinds thereof may be used by mixture. Furthermore, since oxidation power in the float bath is too strong, it is preferable that fluorine (simple substance) is not used.

When liquid is used, for example, the liquid may be supplied to the glass sheet surface by spray coating as the liquid form or the liquid may be vaporized and then supplied to the glass sheet surface. The liquid may be diluted with other kinds of liquid or gas as necessary.

As the gas or liquid containing molecules having fluorine atoms in the structure thereof, liquid or gas other than these kinds of liquid or gas may be included, and liquid or gas which is not reactive with molecules having fluorine atoms at normal temperature is preferably used.

Examples of the liquid or gas include $N_2$, air, $H_2$, $O_2$, Ne, Xe, $CO_2$, Ar, He, Kr, and the like, and the liquid or gas is not limited to these kinds of liquid or gas. Of these kinds of gas, two or more kinds thereof may be used as a mixture.

As carrier gas of the gas containing molecules having fluorine atoms in the structure thereof, inert gas, such as $N_2$ or argon, is preferably used. As the gas containing molecules having fluorine atoms in the structure thereof, $SO_2$ may be further included. $SO_2$ is used when successively producing a glass sheet by a float method or the like, and prevents a conveying roller from being in contact with the glass sheet in an annealing zone, thereby avoiding the occurrence of a flaw in glass. Furthermore, gas which is decomposed at a high temperature may be included.

In the gas or liquid containing molecules having fluorine atoms in the structure thereof, water vapor or water may be included. Water vapor may be extracted by bubbling heated water with inert gas, such as nitrogen, helium, argon, or carbon dioxide. When a large amount of water vapor is required, a method in which water is fed to a vaporizer and directly vaporized may be used.

As a specific example of the method of manufacturing the glass sheet in the present invention, a method of manufacturing a glass sheet represented by a float method is exemplified. In the float method, a glass sheet is manufactured using a glass manufacturing apparatus including a melting furnace in which a raw material of glass is melted, a float bath in which molten glass is floated on a molten metal (tin or the like) to form a glass ribbon, and an annealing furnace in which the glass ribbon is annealed.

When glass is formed on a molten metal (tin) bath, gas or liquid containing molecules having fluorine atoms in the structure thereof may be supplied to the glass sheet being conveyed on the molten metal bath from the side not in contact with the metal surface, thereby treating the glass sheet surface. In the annealing zone subsequent to the molten metal (tin) bath, the glass sheet is conveyed by roller conveying.

Here, the annealing zone includes not only the inside of the annealing furnace but also a portion where the glass sheet is conveyed from the molten metal (tin) bath to the annealing furnace. In the annealing zone, the gas may be supplied from the size not in contact with the molten metal (tin).

Figure 5A:
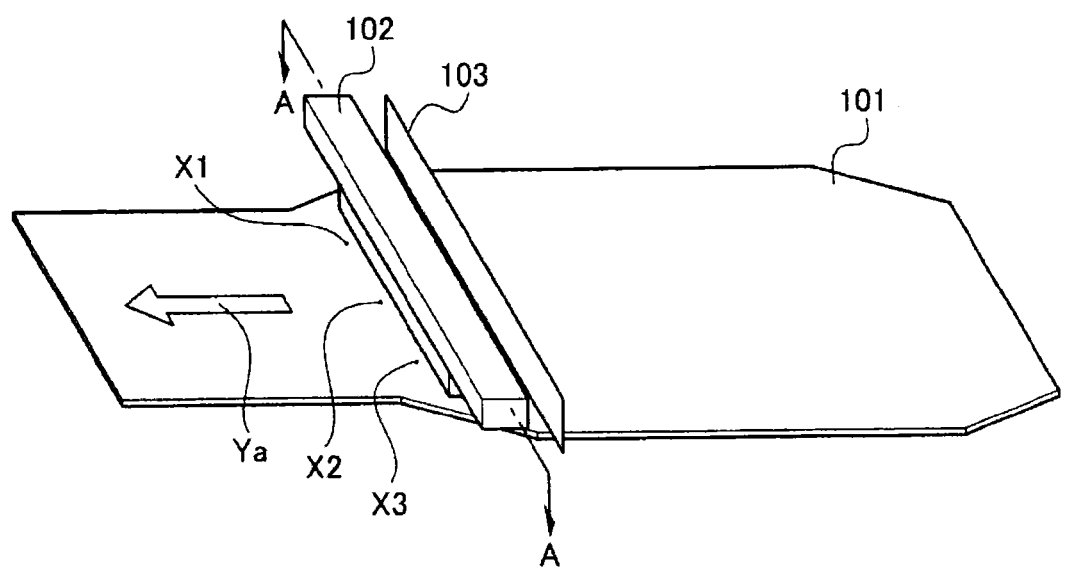
FIG. 5A is a schematic explanatory view of a method of supplying gas containing molecules having fluorine atoms in the structure thereof by a beam to process a surface of glass ribbon in the manufacture of a glass sheet by a float method.

FIG. 5A is a schematic explanatory view of a method of supplying gas containing molecules having fluorine atoms in the structure thereof to treat a glass surface in manufacturing a glass sheet by a float method.

In the float bath in which molten glass is floated on the molten metal (tin or the like) to form a glass ribbon 101, gas containing molecules having fluorine atoms in the structure thereof is sprayed onto the glass ribbon 101 by a beam 102 inserted into the float bath. As shown in FIG. 5A, it is preferable that the gas is sprayed onto the glass ribbon 101 from the side on which the glass ribbon 101 is not in contact with the molten metal surface. An arrow Ya represents a direction in which the glass ribbon 101 flows in the float bath.

It is preferable that the position where the gas is sprayed onto the glass ribbon 101 by the beam 102 is a position where the glass ribbon 101 is preferably 600 to 900° C. or 650 to 900° C., more preferably, 700° C. to 900° C., still more preferably 750 to 850° C., and typically 800° C., when a glass transition point thereof is 550° C. or higher. The position of the beam 102 may be on the upstream side or the downstream side of a radiation gate 103. It is preferable that the amount of the gas to be sprayed onto the glass ribbon 101 is $1\times10^{-6}$ to $5\times10^{-4}$ mol/1 cm$^2$ of glass ribbon as HF.

Figure 5B:
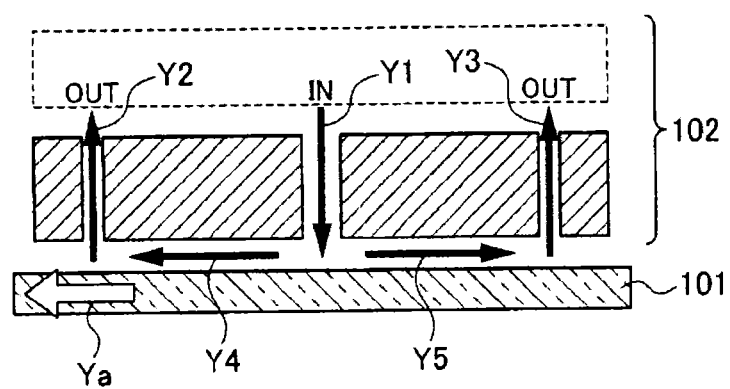
FIG. 5B is a sectional view taken along the line A-A of FIG. 5A.

FIG. 5B is a sectional view taken along the line A-A of FIG. 5A. The gas sprayed onto the glass ribbon 101 from the direction of Y1 by the beam 102 flows in from "IN" and flows out from the direction of "OUT". That is, the gas moves in the direction of arrows Y4 and Y5 and is exposed to the glass ribbon 101. Furthermore, the gas which moves in the direction of the arrow Y4 flows out from the direction of an arrow Y2, and the gas which moves in the direction of the arrow Y5 flows out from the direction of an arrow Y3.

The warpage amount of the glass sheet after chemical strengthening may change depending on the position of the glass ribbon 101 in the width direction, and in this case, it is preferable to adjust the amount of the gas. That is, it is preferable that the amount of the gas to be sprayed increases at a position where the warpage amount is large, and the amount of the gas to be sprayed decreases at a position where the warpage amount is small.

When the warpage amount of the glass sheet after chemical strengthening changes depending on the position of the glass ribbon 101, the structure of the beam 102 may be made such that the amount of the gas can be adjusted in the width direction of the glass ribbon 101, thereby adjusting the warpage amount in the width direction of the glass ribbon 101.

Figure 6A:
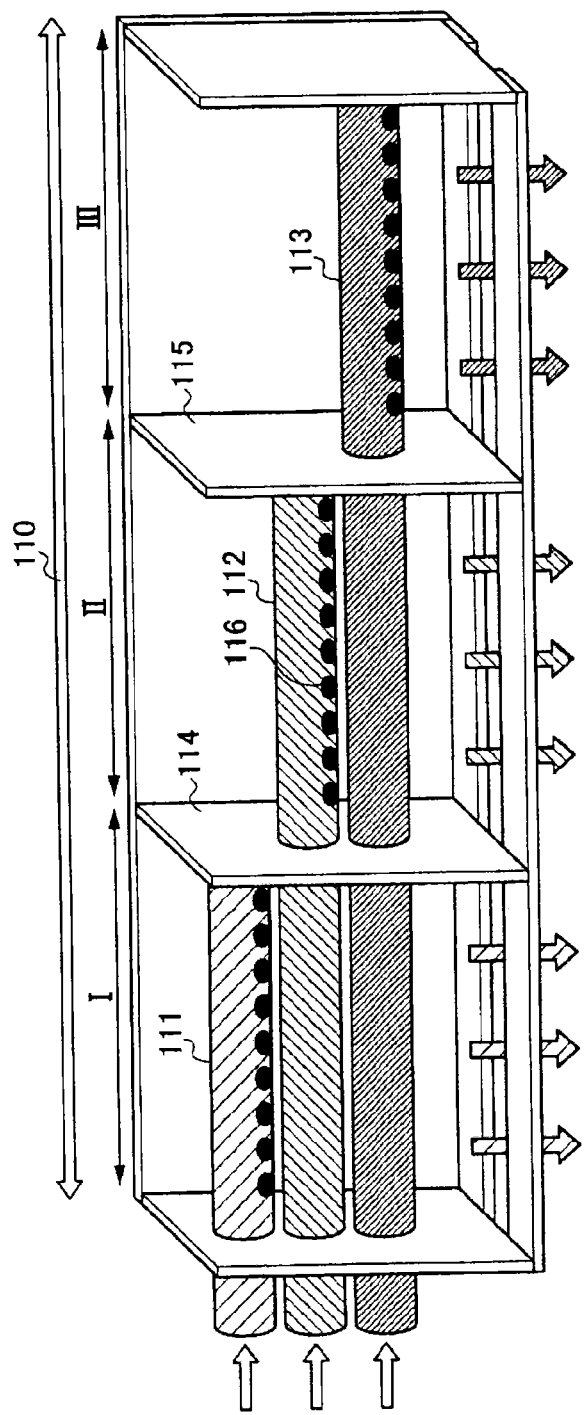
FIGS. 6A-6D are sectional views of a beam which can adjust the amount of gas into three systems in a width direction of glass ribbon.

As a specific example thereof, FIG. 6A shows a sectional view of the beam 102 which adjusts the amount of the gas while dividing the width direction 110 of the glass ribbon 101 into three systems I to III. Gas systems 111 to 113 are divided by partition walls 114 and 115, and the gas flows out from a gas blowing hole 116 and is sprayed onto glass, respectively.

Figure 6D:
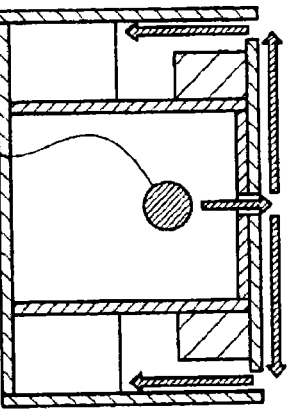

An arrow in FIG. 6A represents the flow of gas. An arrow in FIG. 6B represents the flow of gas in the gas system 111.

Figure 6C:
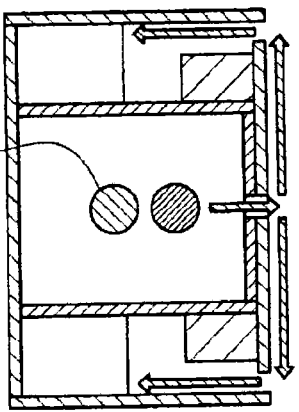
Figure 6B:
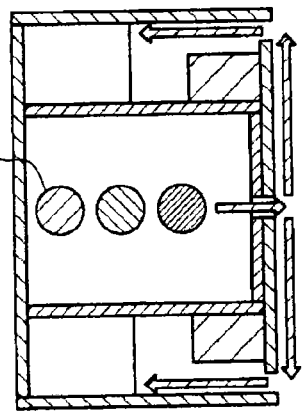

An arrow in FIG. 6C represents the flow of gas in the gas system 112. An arrow in FIG. 6D represents the flow of gas in the gas system 113.

As the method of supplying the gas or liquid containing molecules having fluorine atoms in the structure thereof to the glass surface, for example, a method of using an injector, a method of using an introduction tube, and the like are exemplified.

Figure 2:
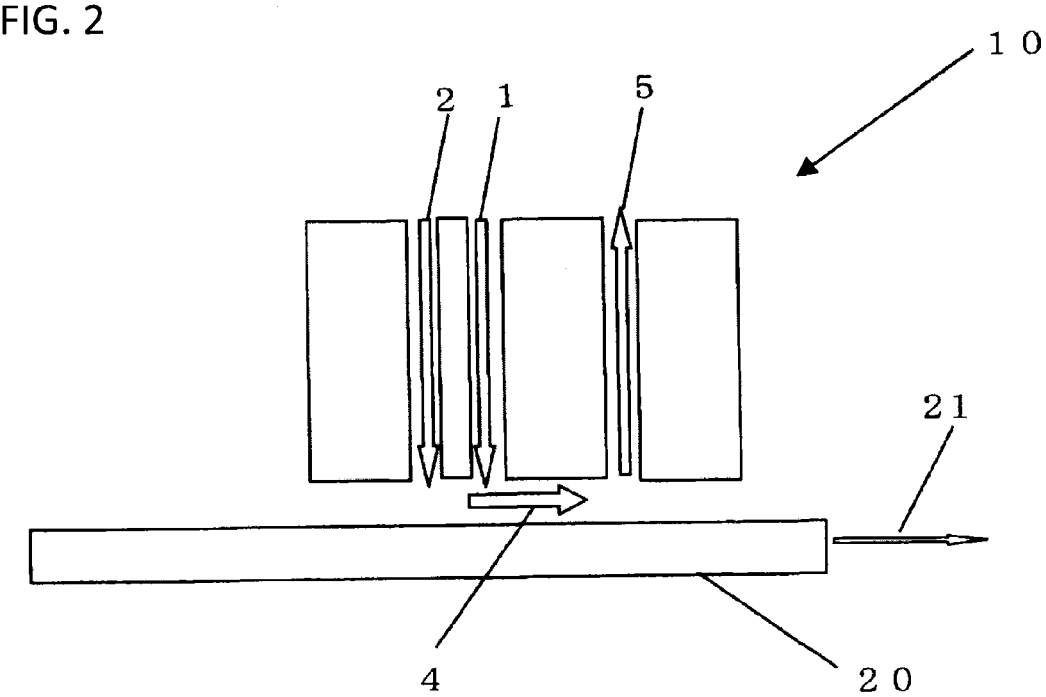
FIG. 2 is a diagram schematically showing a single-flow type injector which can be used in the present invention.

A schematic view of an injector which is used in the surface treatment of a glass sheet and can be used in the present invention is shown in FIGS. 1 and 2. FIG. 1 is a diagram schematically showing a double-flow type injector which can be used in the present invention. FIG. 2 is a diagram schematically showing a single-flow type injector which can be used in the present invention.

When "the gas or liquid containing molecules having fluorine atoms in the structure thereof" supplied from the injector is gas, it is preferable that the distance between a gas discharge port of the injector and the glass sheet is 50 mm or less.

By setting the distance of 50 mm or less, it is possible to suppress the diffusion of gas into air and to allow a sufficient amount of gas to reach the glass sheet with respect to a desired amount of gas. Conversely, if the distance from the glass sheet is too short, when the treatment of a glass sheet to be produced by a float method is performed online, there is a concern that the glass sheet and the injector are in contact with each other due to fluctuation of the glass ribbon.

When "the gas or liquid containing molecules having fluorine atoms in the structure thereof" supplied from the injector is liquid, the distance between the liquid discharge port of the injector and the glass sheet is not particularly limited, and an arrangement may be made such that the glass sheet can be treated evenly.

Any type of injector, such as a double-flow type or a single-flow type, may be used, and two or more injectors may be arranged in series in the flow direction of the glass sheet to treat the glass sheet surface. As shown in FIG. 1, the double-flow type injector is an injector in which the flow of gas from discharge to exhaust is split equally in a forward direction and a backward direction with respect to the moving direction of the glass sheet.

As shown in FIG. 2, the single-flow type injector is an injector in which the flow of gas from discharge to exhaust is fixed to either a forward direction or a backward direction with respect to the moving direction of the glass sheet. When the single-flow type injector is used, it is preferable that the flow of gas on/above the glass sheet and the moving direction of the glass sheet are identical in terms of gas flow stability.

It is preferable that a supply port of the gas or liquid containing molecules having fluorine atoms in the structure thereof and an exhaust port of gas which is generated by a reaction of two or more kinds of gas among unreacted gas or liquid containing molecules having fluorine atoms in the structure thereof, gas which is generated by a reaction with the glass sheet, and the gas or liquid containing molecules having fluorine atoms in the structure thereof are present on the same surface of the glass sheet.

When supplying the gas or liquid containing molecules having fluorine atoms in the structure thereof to the surface of the glass sheet being conveyed to perform surface treatment, for example, in a case where the glass sheet is flowing on a conveyer, the gas or liquid may be supplied from the side not in contact with the conveyer. The gas or liquid may be supplied from the side in contact with the conveyer, by using a mesh material, such as a mesh belt, in which a part of the glass sheet is not covered, in a conveyer belt.

Two or more conveyers may be arranged in series, an injector may be provided between adjacent conveyers, and the gas may be supplied from the side in contact with the conveyer to treat the glass sheet surface. When the glass sheet is flowing on a roller, the gas may be supplied from the side not in contact with the roller or may be supplied from a space between adjacent rollers on the side in contact with the roller.

The same kind or different kinds of gas may be supplied from both sides of the glass sheet. For example, gas may be supplied from both sides of the side not in contact with the roller and the side in contact with the roller to perform surface treatment of the glass sheet. For example, when gas is supplied from both sides in the annealing zone, injectors may be arranged so as to face each other across the glass sheet, and gas may supplied from both sides of the side not in contact with the roller and the side in contact with the roller to glass being successively conveyed.

The injector arranged on the side in contact with the roller and the injector arranged on the side not in contact with the roller may be arranged at different positions in the flow direction of the glass sheet. When arranging the injectors at different positions, any of the injector may be arranged on the upstream side or the downstream side with respect to the flow direction of the glass sheet.

It is widely known that a glass sheet with a functional film is manufactured online in combination of a glass manufacturing technique by a float method and a CVD technique. In this case, it is known that, in regard to a transparent conductive film and its base film, gas is supplied from the surface not in contact with tin or from the surface not in contact with the roller to form a film on the glass sheet.

For example, in the manufacture of the glass sheet with a functional film by online CVD, an injector may be arranged on the surface in contact with the roller, and the gas or liquid containing molecules having fluorine atoms in the structure thereof may be supplied from the injector to the glass sheet to treat the glass sheet surface.

In the present invention, in regard to the temperature of the glass sheet when the gas or liquid containing molecules having fluorine atoms in the structure thereof is supplied to the surface of the glass sheet being conveyed to treat the surface, in a case where the glass transition temperature of the glass sheet is Tg, the surface temperature of the glass sheet is preferably (Tg−200° C.) to (Tg+300° C.), and more preferably (Tg−200° C.) to (Tg+250° C.). Regardless of the above, the surface temperature of the glass sheet is preferably more than 650° C. as long as the surface temperature thereof is equal to or less than (Tg+300° C.). As described in examples described below, if dealkalization is performed at the surface temperature of the glass sheet of 650° C. or lower, a recess is likely to be generated.

In order to suppress the generation of recesses in the glass sheet and to obtain the effect of improvement of warpage effect after chemical strengthening, it is preferable that the surface temperature of the glass sheet is equal to or higher than (Tg+90)° C. In this specification, a recess is a minute hole which is generated in the surface of the glass sheet to be visually recognizable by SEM. A recess is generated in the glass sheet, whereby the strength of the glass sheet is lowered.

Typically, a recess represents a shape which is reduced in diameter in the depth direction from the surface and is widened in a substantially spherical bag shape. The diameter of the recess represents the diameter of a constriction portion between the reduced diameter portion and the bag-shaped portion, and can be observed by a scanning electron microscope (SEM) or the like. The depth of the recess represents the depth from the glass surface to the deepest portion of the bag-shaped portion, and can be measured by cross-section SEM observation or the like.

In the present invention, the recess refers to a recess having a size or a diameter of 10 nm or more. The diameter is usually 20 nm or more, and typically 40 nm or less. The depth of the recess is measured by, for example, cross-section SEM observation. The depth is usually 10 nm or more, and typically 150 nm or less.

If there are recesses in the surface having the higher F concentration with a density of more than 7 recesses/$\mu m^2$, there is a concern that the strength of the glass sheet which has been subjected to chemically strengthening is lowered. Accordingly, even if there are recesses, the density of the recesses is preferably 6 recesses/$\mu m^2$ or less, more preferably 4 recesses/$\mu m^2$ or less, and most preferably 0 recess/$\mu m^2$. The average recess interval when the recess density is 6 recesses/$\mu m^2$ is 460 nm.

Figure 12:
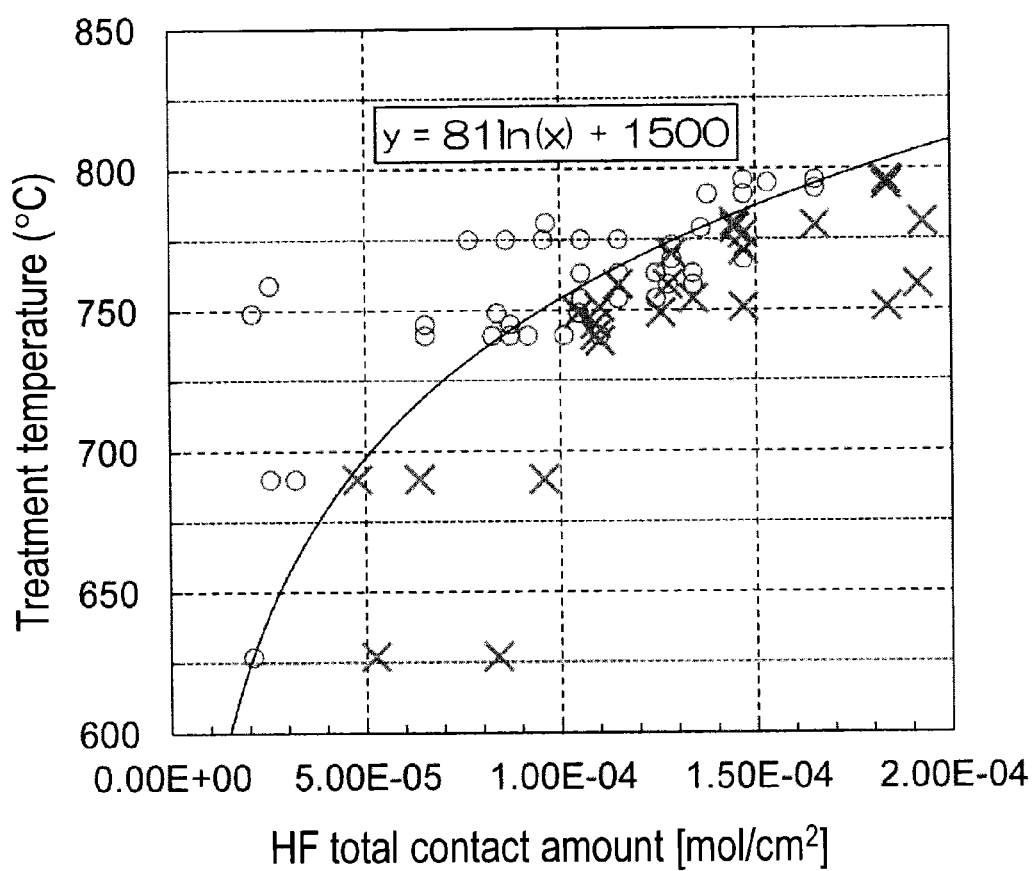
FIG. 12 shows a result of plotting the presence/absence of a recess with respect to an HF total contact amount (mol/cm²) and an HF treatment temperature (° C.).
Figure 13:
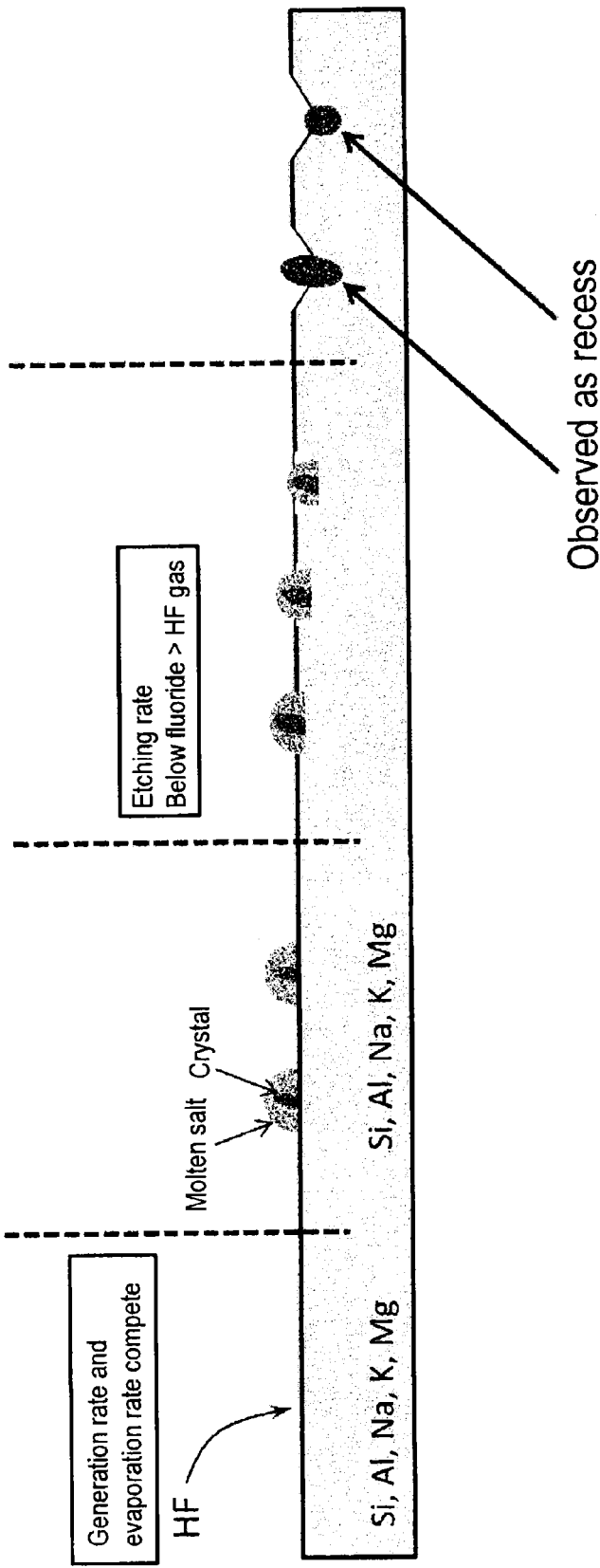
FIGS. 13A-D is an explanatory view of a mechanism of recess generation by HF treatment.

If the presence/absence of a recess is plotted with respect to the HF total contact amount (mol/cm$^2$) and the HF treatment temperature (° C.), a correlation relationship is shown as in the graph of FIG. 12. In FIG. 12, the non-generation of a recess is plotted by O, and the generation of a recess is plotted by x.

The HF total contact amount and the HF treatment temperature satisfy the following expression (a), whereby it is considered that a recess by the HF treatment is not generated. That is, when (1) the treatment temperature is low (the evaporation rate of fluoride is low) and (2) the HF total contact amount is large (the generation rate of fluoride is high), it is considered that recesses are more likely to be generated.

$$Y > 81 \ln X + 1500 \qquad \text{expression (a)}$$

In the expression (a), Y represents the HF treatment temperature (° C.), and X represents the HF total contact amount (mol/cm$^2$). X is determined by the following expression (b), and the treatment time in the expression is the entire time during, in a case of treatment with HF gas, HF gas is in contact with the surface of the glass sheet or the glass ribbon.

[HF total contact amount (mol/cm$^2$)]=[HF gas concentration (vol. %)]×[gas flow rate (mol/s/cm$^2$)]×[treatment time (s)]  (b)

FIGS. 13A-D are explanatory views of a mechanism of recess generation by HF treatment. The followings are considered: HF treatment of glass causes generation and evaporation of fluoride [FIG. 13A]; when the generation rate of fluoride by a reaction of HF and glass is higher than the evaporation rate of the generated fluoride, the generated fluoride remains on the treated surface [FIG. 13B]; molten fluoride is grown in crystal while being etched and molten salt decreases [FIG. 13C]; and as a result, a final product is observed as a recess [FIG. 13D].

The pressure of the glass sheet surface when supplying the gas or liquid containing molecules having fluorine atoms in the structure thereof to the glass sheet surface is preferably in an atmosphere within a pressure range of (atmospheric pressure−100 pascals) to (atmospheric pressure+100 pascals), and more preferably, in an atmosphere within a pressure range of (atmospheric pressure−50 pascals) to (atmospheric pressure+50 pascals).

In regard to the gas flow rate, for example, the case where HF is used as the gas or liquid containing molecules having fluorine atoms in the structure thereof will be described as an example. When performing the treatment of the glass sheet with HF, preferably, the higher the HF flow rate is, the greater the warpage improvement effect during chemical strengthening treatment is, and when the total gas flow is identical, the higher the HF concentration is, the greater the warpage improvement effect during chemical strengthening treatment is.

When the total gas flow and the HF gas flow rate are identical, the longer the treatment time of the glass sheet is, the greater the warpage improvement effect during chemical strengthening treatment is. For example, when the glass sheet is heated, and the gas sheet surface is then treated using the gas or liquid containing molecules having fluorine atoms in the structure thereof, as the conveying speed of the glass sheet is low, the warpage after chemical strengthening is improved. Even in an equipment which cannot control the total gas flow rate or the HF flow rate successfully, the conveying speed of the glass sheet is appropriately controlled, thereby improving the warpage after chemical strengthening.

Figure 4:
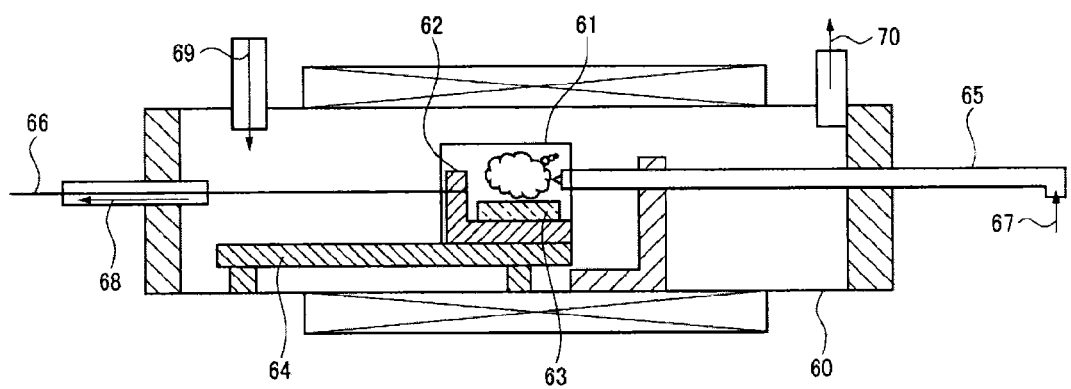
FIG. 4 is a schematic view of a method of supplying gas containing molecules having fluorine atoms in the structure thereof to a glass sheet using an introduction tube.

FIG. 4 is a schematic view of a method of supplying gas containing molecules having fluorine atoms in the structure thereof to a glass sheet using an introduction tube. As the method of supplying gas containing molecules having fluorine atoms in the structure thereof to the glass sheet using the introduction tube, specifically, for example, a sample 63 of a glass sheet placed on a sample loading carriage 62 is moved into a reaction vessel 61 provided at the center of a tube furnace 60 heated to a treatment temperature in advance by moving a slider 64.

Next, after temperature equalization treatment is performed for, preferably, 60 to 180 seconds, gas containing molecules having fluorine atoms in the structure thereof is introduced from the introduction tube 65 in an introduction direction 67 and retained, and is exhausted from an exhaust direction 68. After the retention time ends, the sample 63 undergoes annealing conditions (for example, retention for one minute at 500° C. and retention for one minute at 400° C.), and the sample is extracted by a sample extracting rod 66.

The concentration of gas containing molecules having fluorine atoms introduced from the introduction tube 65 to the glass sheet is preferably 0.01 to 1%, and more preferably 0.05 to 0.5%. The retention time after the introduction of the gas is preferably 10 to 600 seconds, and more preferably 30 to 300 seconds.

3. Chemical Strengthening

Chemical strengthening is treatment in which alkali metal ions (typically, Li ions or Na ions) having a smaller ion radius in a glass surface are exchanged with alkali ions (typically, K ions) having a larger ion radius by ion exchange at a temperature equal to or lower than a glass transition temperature to thereby form a compressive stress layer in the glass surface. The chemical strengthening treatment may be performed by a conventional method in the related art.

The glass sheet of the present invention is a glass sheet in which the warpage after chemical strengthening is improved. The amount of change (the amount of warpage change) in warpage of the glass sheet after chemical strengthening with respect to the glass sheet before chemical strengthening can be measured by a three-dimensional shape measurement instrument (for example, manufactured by MITAKA KOHKI Co., Ltd.).

In the present invention, the improvement of warpage after chemical strengthening is evaluated by the amount of warpage displacement determined by the following expression in an experiment under the same conditions except that surface treatment is performed by the gas or liquid containing molecules having fluorine atoms in the structure thereof.

Amount of warpage displacement=$\Delta Y - \Delta X$ $\Delta X$: amount of warpage change by chemical strengthening of untreated glass sheet $\Delta Y$: amount of warpage amount by chemical strengthening of treated glass sheet Here, the amount of warpage change is a value obtained by subtracting the warpage amount of the glass sheet before chemical strengthening from the warpage amount of the glass sheet after chemical strengthening.

CS and DOL of the glass sheet can be measured by a surface stress meter. The surface compressive stress of the chemically strengthened glass is preferably 600 MPa or more, and the depth of the compressive stress layer is preferably 15 μm or more. The surface compressive stress of the chemically strengthened glass and the depth of the compressive stress layer are set within an appropriate range, whereby excellent strength and scratch resistance are obtained.

Figure 3:
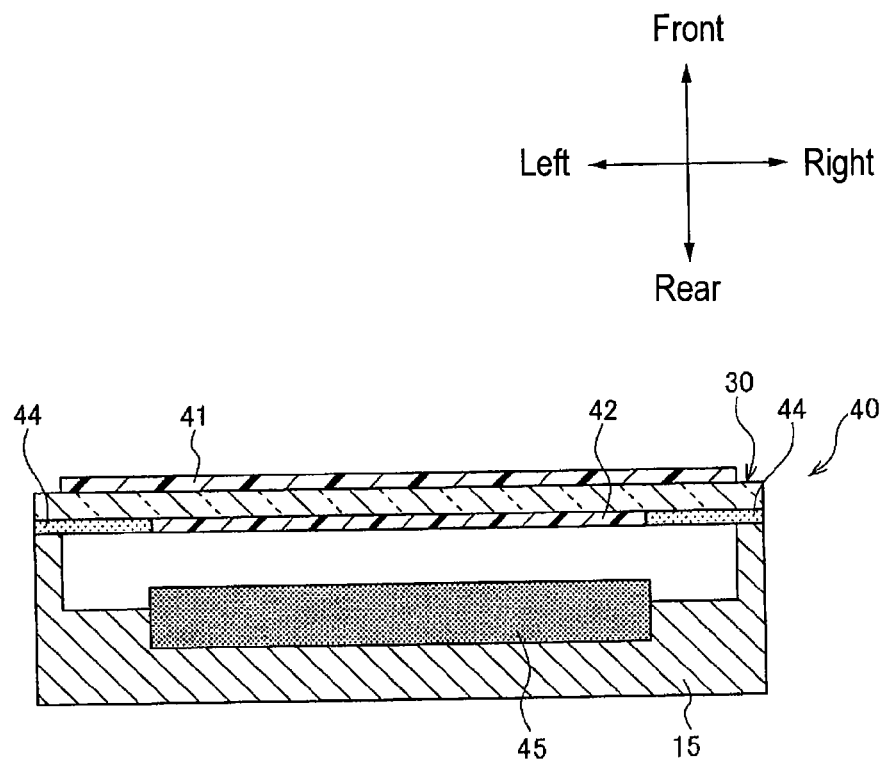
FIG. 3 is a sectional view of a flat panel display in which a float glass for chemical strengthening of the present invention having been subjected to chemical strengthening is used as a cover glass for a flat panel display.

Hereinafter, an example where the glass sheet of the present invention which has been chemically strengthened is used as a cover glass for a flat panel display will be described. FIG. 3 is a sectional view of a display device in which a cover glass is arranged. In the following description, the front, the rear, the left, and the right are based on the directions of arrows in the figures.

As shown in FIG. 2, a display device 40 includes a display panel 45 which is provided in a housing 15, and a cover glass 30 which is provided so as to cover the entire surface of the display panel 45 and to surround the front of the housing 15.

The cover glass 30 is primarily provided for the purpose of improving beauty or strength of the display device 40 or preventing damage caused by impact, and is formed of single sheet-shaped glass having an entire shape of a substantially planar shape. As shown in FIG. 2, the cover glass 30 may be arranged so as to be separated from the display side (front side) of the display panel 45 (to have an air layer) or may be attached to the display side of the display panel 45 through a light transmissive adhesive film (not shown).

A functional film 41 is provided on the front surface of the cover glass 30 on which light from the display panel 45 is emitted, and a functional film 42 is provided on the rear surface, on which light from the display panel 45 is incident, at a position corresponding to the display panel 45. In FIG. 2, although the functional films 41 and 42 are provided on both surfaces, the present invention is not limited thereto, and the functional films 41 and 42 may be provided on the front surface or the rear surfaces or may be omitted.

The functional films 41 and 42 have functions of, for example, preventing reflection of ambient light, preventing damage caused by impact, shielding electromagnetic waves, shielding near infrared rays, correcting color tone, and/or improving scratch resistance, and the thickness, the shape and the like thereof are appropriately selected depending on use applications. For example, the functional films 41 and 42 are formed by attaching a resin-made film to the cover glass 30. Alternatively, the functional films 41 and 42 may be formed by a thin film forming method, such as a vapor deposition method, a sputtering method, or a CVD method.

Reference numeral 44 is a black layer, and for example, is coating formed by coating ink containing a pigment particle on the cover glass 30 and performing ultraviolet irradiation or heating and burning, and then cooling. Thanks to the black layer, the display panel or the like is not viewed from the outside of the housing 15, and the esthetics of the appearance is improved.

EXAMPLES

Hereinafter, examples of the present invention will be specifically described. However, the present invention is not limited to the examples.
(Composition of Glass Sheet)
In this example, glass sheets of glass materials A to D having the following compositions were used.
(Glass material A) Glass containing, in mol %, 72.0% of $SiO_2$, 1.1% of $Al_2O_3$, 12.6% of $Na_2O$, 0.2% of $K_2O$, 5.5% of MgO, and 8.6% of CaO (glass transition temperature: 566° C.)
(Glass material B) Glass containing, in mol %, 64.3% of $SiO_2$, 6.0% of $Al_2O_3$, 12.0% of $Na_2O$, 4.0% of $K_2O$, 11.0% of MgO, 0.1% of CaO, 0.1% of SrO, 0.1% of BaO, and 2.5% of $ZrO_2$ (glass transition temperature: 620° C.)
(Glass material C) Glass containing, in mol %, 64.3% of $SiO_2$, 8.0% of $Al_2O_3$, 12.5% of $Na_2O$, 4.0% of $K_2O$, 10.5% of MgO, 0.1% of CaO, 0.1% of SrO, 0.1% of BaO, and 0.5% of $ZrO_2$ (glass transition temperature: 604° C.)
(Glass material D) Glass containing, in mol %, 73.0% of $SiO_2$, 7.0% of $Al_2O_3$, 14.0% of $Na_2O$, and 6.0% of MgO (glass transition temperature: 617° C.)
(Measurement of Warpage Amount)
The warpage amount was measured by a three-dimensional shape measurement instrument (NH-3MA) manufactured by MITAKA KOHKI Co., Ltd. before chemical strengthening, and then, the respective glass was subjected to chemical strengthening, and the warpage amount after chemical strengthening was measured in the same manner, and Δ warpage amount expressed by the following expression was calculated. In the measurement of the warpage amount in Example 6 described below, a flatness tester FT-17 manufactured by NIDEK Co., Ltd. was used.

Δ Warpage amount=warpage amount after chemical strengthening−warpage amount before chemical strengthening (Amount of Warpage Displacement)
The improvement of warpage after chemical strengthening was evaluated by the amount of warpage displacement determined by the following expression in an experiment under the same conditions except that surface treatment was performed by the gas or liquid containing molecules having fluorine atoms in the structure thereof.

Amount of warpage displacement=ΔY−ΔX

ΔX: amount of warpage change by chemical strengthening of untreated glass sheet
ΔY: amount of warpage amount by chemical strengthening of treated glass sheet
Here, the amount of warpage change was a value obtained by subtracting the warpage amount of the glass sheet before chemical strengthening from the warpage amount of the glass sheet after chemical strengthening.
(Secondary Ion Mass Spectrometry)
The secondary ion intensity $I_{M1}$ of the isotope $M_1$ of the element M in secondary ion mass spectrometry is proportional to the primary ion intensity $I_p$, the sputtering rate Y of the matrix, the concentration $C_M$ (the ratio to the total concentration) of the element M, the presence probability $\alpha_1$ of the isotope $M_1$, the secondary ionization rate $\beta_M$ of the element M, and the permeation efficiency η (including detection efficiency of a detector) of the mass spectrometer.

$$I_{M1}=A \cdot I_P \cdot Y \cdot C_M \cdot \alpha_1 \cdot \beta_M \cdot \eta \quad \text{(Expression 1)}$$

Here, A is the ratio of a detection area of a secondary ion to the scanning range of a primary ion beam. A main component element or the like in the same sample is used as a reference element, and the ratio to (Expression 1) is taken, thereby deleting η.
When a reference element is R and an isotope thereof is $R_j$, (Expression 2) is obtained.

$$I_{M1}/I_{Rj}=(C_M \cdot \alpha_1 \cdot \beta_M)/(C_R \cdot \alpha_j \cdot \beta_R)=C_M/K \quad \text{(Expression 2)}$$

K is a relative sensitivity factor of the element M to the element R.

$$K=(C_R \cdot \alpha_j \cdot \beta_R)/(\alpha_1 \cdot \beta_M) \quad \text{(Expression 3)}$$

The concentration of the element M is determined from (Expression 4).

$$C_M=K \cdot I_{M1}/I_{Rj} \quad \text{(Expression 4)}$$

In the present invention, F corresponds to $M_1$, and Si corresponds to $R_j$. Accordingly, the intensity ratio (F/Si) of both is equal to a value obtained by dividing the fluorine concentration $C_H$ by K from (Expression 2). That is, F/Si was a direct index of the fluorine concentration.
The analysis conditions of the secondary ion mass spectrometry were as follows.
Measurement apparatus: ADEPT 1010 manufactured by Ulvac-Phi Incorporated
Primary ion species: Cs+
Primary acceleration voltage: 5.0 kV
Primary ion current: 1 μA
Primary ion incident angle (angle from direction perpendicular to sample surface): 60°
Luster size: 200×200 μm²
Detection region: 40×40 μm²
Secondary ion polarity: minus
Electron gun for neutralization: used
The depth on the horizontal axis of a profile in a depth direction obtained by SIMS analysis was determined by measuring the depth of the analysis crater using the probe type film thickness meter (for example, Dektak 150 manufactured by Veeco Instruments).
(ΔF/ΔH₂O)
The average fluorine concentration and the average $H_2O$ concentration were determined from the SIMS profile of the fluorine concentration and the $H_2O$ concentration at the depth of 1 to 24 μm in the top surface and bottom surface of glass, and $\Delta F/\Delta H_2O$ was calculated. In regard to the fluorine concentration and the $H_2O$ concentration, the calibration curve was drawn from the profile of the standard sample with a known concentration, and the fluorine concentration and the $H_2O$ concentration of the sample to be measured are determined.
In regard to the standard sample, the $H_2O$ concentration in glass, that is, the moisture concentration $[C_{H2O}$ (mol %)] in glass was calculated by the expression (ii) using Lambert-Beers' law expressed in the expression (i), d: specific gravity (g/cm³) of glass, and Mw: average molecular weight of glass. Note that ϵ=59, d=2.5, and Mw=64.05.

$$A_{H2O}=\epsilon_{H2O} \times C \times l \quad \text{(i)}$$

$\epsilon_{H2O}$: molar absorbance coefficient (L mol⁻¹ cm⁻¹) of $H_2O$ in glass
C: $H_2O$ concentration (mol L⁻¹) in glass
l: optical path length (cm)

[Equation 2]

$$C_{H2O} \text{ (mol \%)}=[(A_{H2O}/\epsilon_{H2O} \times l)/(d/Mw)] \times 100 \quad \text{(ii)}$$

"ΔF" is a value obtained by subtracting an average fluorine concentration (mol %) by SIMS at the depth of 1 to 24 μm in the surface having the lower fluorine concentration from an average fluorine concentration (mol %) by SIMS at the depth of 1 to 24 μm in the surface having the higher fluorine concentration.

"ΔH₂O" is the absolute value of a value obtained by subtracting an average H₂O concentration (mol %) by SIMS at the depth of 1 to 24 μm in the surface having the higher fluorine concentration from an average H₂O concentration (mol %) by SIMS at the depth of 1 to 24 μm in the surface having the lower fluorine concentration.

(Penetration Depth x of Fluorine)

The maximum depth x (μm) at which the gradient at an arbitrary depth $x_i$ (μm) satisfies the following expression (3) in the F concentration profile by SIMS was determined by the following expression (3).

$$[F(x_i)-F(x_i+0.1)]/0.1=-0.015 \quad (3)$$

In the expression (3), $F(x_i)$ represents the fluorine concentration (mol %) by SIMS at the depth $x_i$ (μm).

(Presence/Absence of Recess)

An HF treated surface of glass was observed by a SEM, and when one or more recesses were observed within an observation visual field (magnification: 50,000 to 200,000), a recess was determined to be present.

(Ball on Ring Test)

In a ball on ring (BOR) test, in a state where the glass sheet was placed in a horizontal direction, the glass sheet was pressed using a pressure jig (quenching steel, diameter: 10 mm, mirror finishing) made of SUS304, and the strength of the glass sheet was measured.

A glass sheet as a sample was placed in a horizontal direction on a receiving jig (diameter: 30 mm, curvature of contact portion: R 2.5 mm, contact portion: quenching steel, mirror finishing) made of SUS304, and a pressure jig for pressing the glass sheet was provided above the glass sheet. The center region of the glass sheet was pressed from the upper side of the glass sheet, and a breaking load (unit: N) when glass was broken was referred to as BOR strength. The test conditions were as follows.

Thickness of sample: 1.1 (mm)
Descending speed of pressure jig: 1.0 (mm/min)

Example 1

HF treatment (HF concentration: 0 to 2.0%) was carried out in a float bath in which a glass ribbon of glass material C was flowing. An average fluorine concentration at the depth of 0 to 20 μm and an average fluorine concentration at the depth of 50 to 70 μm of the obtained glass surface were measured by SIMS analysis.

The obtained glass having a sheet thickness of 0.7 mm was cut into three sheets of 100 mm square, warpage of two diagonal lines of a portion corresponding to a 90 mm square portion of the substrate was measured, and the average value was set as a warpage amount before strengthening. Thereafter, glass was immersed in $KNO_3$ molten salt heated to 435° C., for 4 hours, thereby performing chemical strengthening. Next, the warpage of the two diagonal lines of the portion corresponding to the 90 mm square portion of the substrate was measured, the average value was set as a warpage amount after strengthening, and the amount of warpage displacement was calculated.

Comparative Example 1-1 is a reference where HF treatment is not carried out. It can be considered that numerical values of the depth of 50 to 70 μm on the top surface side of Example 1-7 are the same as that of the glass surface not subjected to HF treatment from three data points (the top surface and the bottom surface of Comparative Example 1-1 and the bottom surface of Example 5-7) at the depth of 0 to 20 μm.

The result is shown in Table 1. A graph plotting ΔF/ΔH₂O on the horizontal axis and the amount of warpage displacement (μm) on the vertical axis is shown in FIG. 10. In Examples 1-1 to 1-6 and Comparative Examples 1-1 and 1-2, the generation of recesses was not observed. In Examples 1-7 and 1-8, the generation of recesses was observed.

TABLE 1

| | HF treatment | | | | Surface stress | | Warpage [μm] | | | |
|---|---|---|---|---|---|---|---|---|---|---|
| | Treatment temperature [° C.] | L/S [m/h] | HF contact time [S] | HF total contact amount [mol/cm²] | CS (MPa) | DOL (μm) | Before chemical strengthening | After chemical strengthening | Δ Warpage amount | Amount of warpage displacement |
| Example 1-1 | 757 | 755 | 2.9 | 1.28E−05 | 768.5 | 46.9 | 10.4 | 122.9 | 112.5 | 47.5 |
| Example 1-2 | 757 | 755 | 2.9 | 6.39E−05 | 757.5 | 49.2 | 10.8 | 67.4 | 56.6 | 103.4 |
| Example 1-3 | 757 | 755 | 2.9 | 4.82E−05 | 791.4 | 46.2 | 12.8 | 75.3 | 62.5 | 97.5 |
| Example 1-4 | 757 | 755 | 2.9 | 9.58E−05 | 789.3 | 48.4 | 8.0 | 22.4 | 14.4 | 145.6 |
| Example 1-5 | 757 | 755 | 2.9 | 1.44E−04 | 779.9 | 48.2 | 10.6 | −12.1 | −22.7 | 182.7 |
| Example 1-6 | 757 | 755 | 2.9 | 1.28E−04 | 764.7 | 47.6 | 5.0 | 39.1 | 34.1 | 125.9 |
| Example 1-7 | 757 | 755 | 2.9 | 2.55E−04 | 755.3 | 47.7 | 3.3 | −85.5 | −88.8 | 248.8 |
| Example 1-8 | 690 | 755 | 2.9 | 9.58E−05 | 770.4 | 47.7 | 6.6 | 74.8 | 68.2 | 91.8 |
| Example 1-9 | 627 | 690 | 3.1 | 1.05E−04 | 786.9 | 47.8 | 8.5 | 125.5 | 117.0 | 43.0 |
| Comparative Example 1-1 | — | 755 | 2.9 | 0.00E+00 | 775.3 | 47.3 | 13.2 | 173.2 | 160.0 | 0.0 |

| | F concentration analysis | | | H₂O concentration analysis | | | | |
|---|---|---|---|---|---|---|---|---|
| | T surface Average F concentration [mol %] at 1 to 24 μm | B surface Average F concentration [mol %] at 1 to 24 μm | T surface − B surface ΔF [mol %] | T surface Average H₂O concentration [mol %] at 1 to 24 μm | B surface Average H₂O concentration [mol %] at 1 to 24 μm | B surface − T surface ΔH₂O [mol %] | ΔF/ΔH₂O | X (μm) |
| Example 1-1 | 0.00621 | 0.00175 | 0.0045 | 0.0754 | 0.0994 | 0.024 | 0.186 | 3.5 |
| Example 1-2 | 0.01364 | 0.00175 | 0.0119 | 0.0768 | 0.0994 | 0.023 | 0.526 | 5.2 |
| Example 1-3 | 0.00724 | 0.00175 | 0.0055 | 0.0737 | 0.0994 | 0.026 | 0.214 | 4.5 |
| Example 1-4 | 0.01124 | 0.00175 | 0.0095 | 0.0750 | 0.0994 | 0.024 | 0.390 | 4.9 |
| Example 1-5 | 0.01715 | 0.00175 | 0.0154 | 0.0756 | 0.0994 | 0.024 | 0.647 | 5.5 |

TABLE 1-continued

| | | | | | | | | |
|---|---|---|---|---|---|---|---|---|
| Example 1-6 | 0.01263 | 0.00175 | 0.0109 | 0.0743 | 0.0994 | 0.025 | 0.435 | 4.9 |
| Example 1-7 | 0.02430 | 0.00175 | 0.0225 | 0.0741 | 0.0994 | 0.025 | 0.894 | 6.1 |
| Example 1-8 | — | — | — | — | — | — | — | — |
| Example 1-9 | — | — | — | — | — | — | — | — |
| Comparative Example 1-1 | 0.00230 | 0.00175 | 0.0005 | 0.0765 | 0.0994 | 0.023 | 0.024 | 0 |

As shown in Table 1, the glass sheet of Example 1-7 which had been subjected to surface treatment with HF was improved in warpage after chemical strengthening, as compared to the case of Comparative Example 1-1 where surface treatment with HF was not carried out. From this, it was found that, in a glass sheet in which the average fluorine concentration in one surface at the depth of 0 to 20 μm by SIMS analysis was higher than the average fluorine concentration in the other surface at the depth of 0 to 20 μm, Δ warpage amount was small and warpage after chemical strengthening was improved. In Examples 5-1 to 5-4 and Comparative Example 5-1, the generation of recesses was not observed. In Examples 5-5 to 5-9, the generation of recesses was observed.

As shown in FIG. 10, $\Delta F/\Delta H_2O$ and the amount of warpage displacement had a correlation relationship (y=279.81x). In order to improve warpage after chemical strengthening, the amount of warpage displacement was preferably 10 or more, and from the graph shown in FIG. 10, it was found that, when $\Delta F/\Delta H_2O$ was 0.07 or more, warpage after chemical strengthening could be effectively improved. As shown in Table 1, in Examples 1-1 to 1-7 where $\Delta F/\Delta H_2O$ was 0.07 or more, it was found that warpage after chemical strengthening was effectively improved. As shown in Table 1, in Examples 1-1 to 1-7 where x (μm) was 1 or more, warpage after chemical strengthening was effectively improved.

Example 2

HF treatment (HF concentration: 2%) was carried out in a float bath, in which a glass ribbon of glass material C was flowing, at the surface treatment shown in Table 2, and the fluorine penetration depth x (μm) of the obtained glass having a sheet thickness of 0.7 mm was measured. The glass was cut into three sheets of 100 mm square, and warpage of two diagonal lines of a portion corresponding to a 90 mm square portion of the substrate was measured, and the average value was set as a warpage amount before strengthening.

Thereafter, glass was immersed in $KNO_3$ molten salt heated to 435° C., for 4 hours, thereby performing chemical strengthening. Next, the warpage of the two diagonal lines of the portion corresponding to the 90 mm square portion of the substrate was measured, and the average value was set as a warpage amount after strengthening, and the amount of warpage displacement was calculated. The result is shown in Table 2.

TABLE 2

| Treatment Temperature (° C.) | F penetration depth (μm) | Amount of warpage displacement (μm) |
|---|---|---|
| 500 | 0.5 | 0 |
| 550 | 0.9 | 3 |
| 600 | 1.3 | 10 |
| 650 | 2.3 | 22 |

TABLE 2-continued

| Treatment Temperature (° C.) | F penetration depth (μm) | Amount of warpage displacement (μm) |
|---|---|---|
| 700 | 3.4 | 35 |
| 800 | 6.5 | 87 |
| 900 | 12.3 | 226 |

From the result shown in Table 2, it was found that, when x (μm) was 1 or more, warpage after chemical strengthening could be effectively improved.

Example 3

As shown in FIG. 5A, in a float bath in which a glass ribbon of glass material C was flowing, HF was sprayed onto a glass ribbon 101 by the beam 102, which had been inserted at the position where the glass ribbon 101 was about 800° C., under the conditions shown in Table 3.

In Example 2-1, as shown in Table 3, in regard to the operation conditions, the HF supply amount was changed by changing the HF mol concentration of process gas to be sprayed depending on a site [in FIG. 5A, X1: 1741.5 mm from the center of the glass ribbon 101 in the width direction, X2: the center of the glass ribbon 101 in the width direction, X3: −1841.5 mm from the center of the glass ribbon 101 in the width direction, and X1 to X3 are positions directly below the beam].

The obtained glass having a sheet thickness of 0.7 mm was cut to 100 mm square at the sites corresponding to the center of the glass ribbon 101 in the width direction and +1741.5, 0 and −1841.5 mm (the center position of the glass ribbon was the origin, and the right side in the flow direction as the positive direction) from the center, and a value corresponding to warpage of a 90 mm square portion of each substrate was measured and set as a warpage amount before strengthening. Thereafter, glass was immersed in $KNO_3$ molten salt heated to 450° C., for 2 hours, thereby performing chemical strengthening.

Next, the value corresponding to the warpage of the 90 mm square portion of the substrate was measured, and the average value was set as a warpage amount after strengthening. Furthermore, glass at the position of 368 mm from the center of the glass ribbon 101 in the width direction shown in FIG. 5A was cut and the value of surface stress was measured. The result is shown in Table 3.

In regard to glass at the positions corresponding to the sites X1, X2, and X3, the F/Si intensity ratio at the depth of 0 to 20 μm in the top surface and the bottom surface and the F/Si intensity ratio at the depth of 50 to 70 μm in the top surface are shown in the column of F/Si intensity ratio average value of the table. In the table, for example, "5.2E+18" is an abbreviation of $5.2 \times 10^{18}$, and "→" represents that the numerical value of the column is the same as the numerical value of a column on the right side.

TABLE 3

| | | Process condition | | | | | Warpage [μ] | | | | | | | | |
|---|---|---|---|---|---|---|---|---|---|---|---|---|---|---|---|
| | | Sheet thickness | Treatment temperature | Surface stress | | position | Before chemical strengthening | | | After chemical strengthing | | | Δ Warpage amount | | |
| | | | | CS | DOL | X | | | | | | | | | |
| | | [mm] | [° C.] | (MPa) | (μm) | | 1741.5 | 0.0 | −1842 | 1741.5 | 0.0 | −1842 | 1741.5 | 0.0 | −1842 |
| Comp. Ex. 3-1 | Reference (no treatment) | 0.71 | 796 | 751.8 | 43 | | −11.4 | 8.3 | −7.9 | 92.7 | 133.0 | 102.4 | 104.0 | 124.7 | 110.3 |
| Ex. 3-1 | HF total contact amount 1.1/1.7/1.1 [E-4 mol/cm$^2$] | 0.71 | 796 | 718.9 | 43.0 | | −9.9 | 4.9 | −11.0 | −7.5 | −4.0 | 8.5 | 2.4 | −8.9 | 19.5 |
| Ex. 3-2 | HF total contact amount entire site 1.7 [E-4 mol/cm$^2$] | 0.71 | 796 | 709.6 | 44.4 | | −14.0 | −4.7 | −13.0 | −47.7 | −10.3 | −39.1 | −33.7 | −5.7 | −26.0 |

| | | F concentration [%] | | | | | | | | |
|---|---|---|---|---|---|---|---|---|---|---|
| | | Treated surface (0 to 1 μm depth) | | | Untreated surface (0 to 1 μm depth) | | | Δ (0 to 1 μm depth) | | |
| | | 1741.5 | 0.0 | −1841.5 | 1741.5 | 0.0 | −1841.5 | 1741.5 | 0.0 | −1841.5 |
| Comp. Ex. 3-1 | Reference (no treatment) | → | → | 0.00 | → | → | 0.00 | → | → | 0.00 |
| Ex. 3-1 | HF total contact amount 1.1/1.7/1.1 [E-4 mol/cm$^2$] | 0.13 | 0.19 | 0.13 | 0.00 | 0.00 | 0.00 | 0.13 | 0.19 | 0.13 |
| Ex. 3-2 | HF total contact amount entire site 1.7 [E-4 mol/cm$^2$] | → | → | 0.19 | → | → | 0.00 | → | → | 0.19 |

As shown in Table 3, from Comparative Example 3-1, it was found that the warpage amount was different in the width direction of the glass ribbon. Compared to Example 3-2 where the HF spray concentration was identical over the entire site, in Example 3-1, the warpage amount after strengthening of each site was a value closer to 0 μm. From this result, it was found that the warpage amount after strengthening in the width direction of the glass ribbon could be closer to a uniform value by changing the HF supply amount depending on site. In Examples 3-1 to 3-2 and Comparative Example 3-1, the generation of recesses was not observed.

Example 3

An analysis result of the correlation relationship among the HF total contact amount, the treatment temperature, and the presence/absence of recesses based on a SEM observation result of glass which was produced using the instrument of Examples 1 and 2 and was subjected to HF treatment in the float bath is shown in FIG. 12.

From the obtained result, it was found that, when the HF total contact amount and the HF treatment temperature satisfied the following expression (a), recesses by HF treatment were not generated.

$$Y > 81 \ln X + 1500 \quad \text{expression (a)}$$

In the expression (a), Y represents the HF treatment temperature (° C.), and X represents the HF total contact amount (mol/cm$^2$). X was determined by the following expression (b).

HF total contact amount (mol/cm$^2$)=HF gas concentration (vol. %)×gas flow rate (mol/s/cm$^2$)×treatment time (s)    expression (b)

The treatment time is a value obtained by dividing a gas spray region length (m) by a glass ribbon speed (m/s), and the gas spray region length is the distance between two gas channels which is shown by characters "OUT" in FIG. 5B, that is, the distance where gas is in contact with the glass ribbon.

Example 4

HF treatment was carried out in the float bath in which a glass ribbon of glass material C was flowing. The HF treatment was (1) untreated, (2) treatment with the HF total contact amount of 1.92×10$^{-5}$ (mol/cm$^2$) at 749° C. of the glass ribbon, (3) treatment with the HF total contact amount of 1.28×10$^4$ (mol/cm$^2$) at 749° C. of the glass ribbon, or (4) treatment with the HF total contact amount of 1.92×10$^4$ (mol/cm$^2$) at 749° C. of the glass ribbon. The obtained glass sheet (50 mm square) was subjected to chemical strengthening with KNO$_3$ for 200 minutes at 453° C., and strength was evaluated by a BOR test. Furthermore, the surface of the glass sheet was observed by a SEM (magnification: 50000). The result is shown in FIG. 14.

Figure 14:
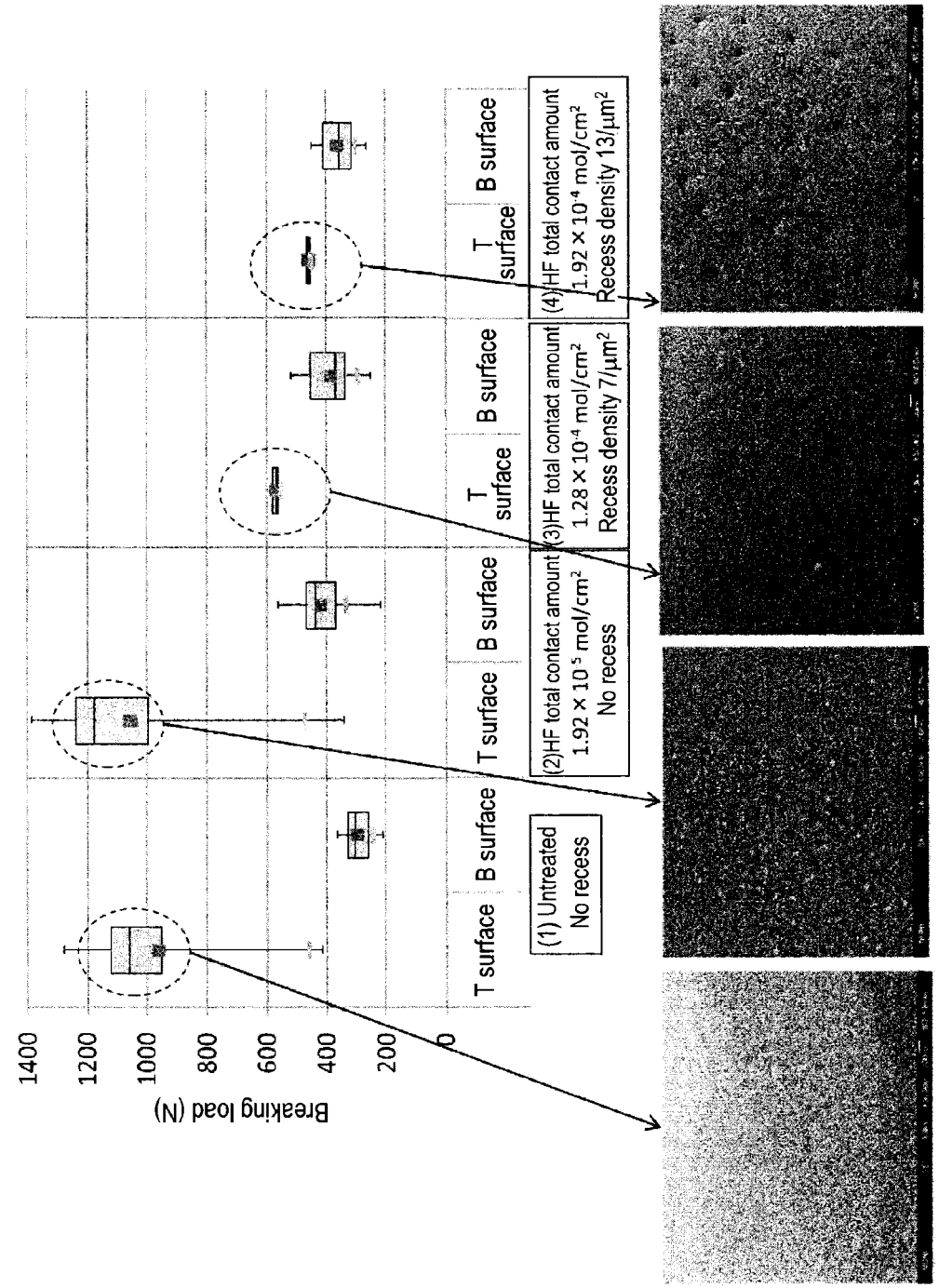
FIG. 14 shows a result of a BOR test and a result of observation of a glass sheet by a SEM.

From the result shown in FIG. 14, it was found that, if the HF concentration during the HF treatment was high, the number of recesses was increased, and the strength of the glass sheet was lowered. If the recess density of the glass surface was estimated from the SEM observation result, in each glass surface, the recess density in (1) and (2) was 0 recess/µm$^2$, the recess density in (3) was 7 recesses/µm$^2$, and the recess density in (4) was 13 recesses/µm$^2$. The observed recess has a diameter of 10 to 30 nm and a depth of 10 nm or more.

Although the present invention has been described in detail using specific embodiments, it is obvious to those skilled in the art that various alterations and modifications may be made without departing from the spirit and scope of the present invention. This application is based on Japanese Patent application No. 2012-069557 filed on Mar. 26, 2012, Japanese Patent Application No. 2012-081072 filed on Mar. 30, 2012, and Japanese Patent Application No. 2012-276840 filed on Dec. 19, 2012, the contents of which are incorporated herein by reference.

REFERENCE SIGNS LIST

1: Center slit
2: Outer slit
4: Channel
5: Discharge slit
20: Glass sheet
30: Cover glass
40: Display device
41, 42: Functional film
15: Housing
45: Display panel
61: Reaction vessel
62: Sample loading carriage
63: Sample
64: Slider
65: Introduction tube
66: Sample extracting rod
101: Glass ribbon
102: Beam
103: Radiation gate
110: Width direction of glass ribbon
111, 112, 113: Gas system
114, 115: Partition wall
116: Gas blowing hole

The invention claimed is:

1. A glass sheet, having one surface and the other surface facing the one surface in a thickness direction, wherein a fluorine concentration in the one surface is higher than the fluorine concentration in the other surface in which the fluorine concentration is an average fluorine concentration (mol %) by SIMS at a depth of 1 to 24 µm, and the following expression (1) is satisfied:

$$0.07 \leq \Delta F/\Delta H_2O \qquad (1)$$

wherein $\Delta F$ is a value obtained by subtracting an average fluorine concentration (mol %) by SIMS at the depth of 1 to 24 µm in the surface having the lower fluorine concentration from the average fluorine concentration (mol %) by SIMS at the depth of 1 to 24 µm in the surface having the higher fluorine concentration, and $\Delta H_2O$ is an absolute value of a value obtained by subtracting an average $H_2O$ concentration (mol %) by SIMS at the depth of 1 to 24 µm in the surface having the higher fluorine concentration from the average $H_2O$ concentration (mol %) by SIMS at the depth of 1 to 24 µm in the surface having the lower fluorine concentration, wherein the surface having the higher fluorine concentration does not include a recess having a diameter of 10 nm or more; or wherein the surface having the higher fluorine concentration comprises one or more recesses with a density of 6 recesses/µm$^2$ or less.

2. The glass sheet according to claim 1, which is manufactured by a float method.

3. The glass sheet according to claim 1, which has a thickness of 1.5 mm or less.

4. The glass sheet according to claim 1, which has a thickness of 0.8 mm or less.

5. A glass sheet, which is obtained by chemically strengthening the glass sheet according to claim 1.

6. A flat panel display device, comprising a cover glass, wherein the cover glass is the glass sheet according to claim 5.

7. The glass sheet according to claim 1, which is prepared by contacting a glass sheet with fluorine wherein the glass sheet has a surface temperature of greater than 650° C.

* * * * *